United States Patent
Yoshida

(10) Patent No.: US 9,753,325 B2
(45) Date of Patent: Sep. 5, 2017

(54) DISPLAY APPARATUS WITH VIDEO DATA INTERPOLATION CIRCUITRY PREPARING POST-INTERPOLATION DATA BASED ON A LENS SHAPE AND DISPLAY METHOD

(71) Applicant: Sharp Kabushiki Kaisha, Osaka-shi, Osaka (JP)

(72) Inventor: Shigeto Yoshida, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/416,325

(22) PCT Filed: Jul. 18, 2013

(86) PCT No.: PCT/JP2013/069471
§ 371 (c)(1),
(2) Date: Jan. 22, 2015

(87) PCT Pub. No.: WO2014/050265
PCT Pub. Date: Apr. 3, 2014

(65) Prior Publication Data
US 2015/0177561 A1  Jun. 25, 2015

(30) Foreign Application Priority Data

Sep. 25, 2012  (JP) .................... 2012-211498

(51) Int. Cl.
*G09G 3/36* (2006.01)
*G02F 1/1335* (2006.01)
*G02F 1/1362* (2006.01)
*G02F 1/1333* (2006.01)

(52) U.S. Cl.
CPC ...... *G02F 1/133526* (2013.01); *G02F 1/1362* (2013.01); *G09G 3/36* (2013.01); *G02F 2001/133331* (2013.01); *G02F 2001/133562* (2013.01); *G09G 2310/0232* (2013.01); *G09G 2340/0407* (2013.01)

(58) Field of Classification Search
CPC ......... G09G 2300/02; G09G 2300/023; G09G 2300/026; G09G 3/36; G09G 3/3625; G09G 3/3648
USPC ..................... 345/87–104, 1.1–1.3
See application file for complete search history.

(56) References Cited

U.S. PATENT DOCUMENTS

| | | | | |
|---|---|---|---|---|
| 5,953,106 A * | 9/1999 | Unno | ................ | G03F 7/70891 250/370.15 |
| 9,146,400 B1 * | 9/2015 | Lee | ................ | G02B 3/0037 |
| 2004/0051944 A1 * | 3/2004 | Stark | ................ | G02F 1/13336 359/448 |
| 2008/0186252 A1 * | 8/2008 | Li | ................ | G02F 1/13336 345/1.1 |
| 2008/0246781 A1 * | 10/2008 | Surati | ................ | H04N 5/74 345/690 |

(Continued)

Primary Examiner — Amare Mengistu
Assistant Examiner — Nelson Lam
(74) *Attorney, Agent, or Firm* — Keating & Bennett, LLP

(57) ABSTRACT

The present invention suppresses expansion and contraction of a display image that occur in association with a change in the shape of a lens.
A display device is equipped with an acquisition unit (50) that acquires a deviation amount by which a measurement position on a lens is displaced due to a change in the lens shape from a reference position before the change of the shape. A video data interpolation unit (51) prepares post-interpolation video data on the basis of the deviation amount.

17 Claims, 15 Drawing Sheets

(56) References Cited

U.S. PATENT DOCUMENTS

| | | | | |
|---|---|---|---|---|
| 2010/0238090 A1* | 9/2010 | Pomerantz | .......... | G02F 1/13336 345/1.3 |
| 2011/0102302 A1* | 5/2011 | Watanabe | ........... | G02F 1/13336 345/4 |
| 2011/0109535 A1* | 5/2011 | Watanabe | ........... | G02F 1/13336 345/87 |
| 2011/0249021 A1* | 10/2011 | Yoshida | ................... | G09G 3/20 345/606 |
| 2012/0249622 A1* | 10/2012 | Yoshida | ............... | G09G 3/3611 345/698 |
| 2013/0301263 A1* | 11/2013 | Yamanaka | ................ | G09F 9/35 362/235 |

* cited by examiner

ENLARGEMENT WIDTH $I$
$= [Width(j_1) - Width(i_1)] + [Width(j_2) - Width(i_2)] + \cdots + [Width(j_n) - Width(i_n)]$
$= Width(i_1)(r_1 - 1) + Width(i_2)(r_2 - 1) + \cdots + Width(i_n)(r_n - 1)$

FIG. 16

| SHIFTED AMOUNT (mm) | DATA NUMBER GROUP |
|---|---|
| 0 | 1, 3, 5, 7 ⋯ |
| 1 | 2, 4, 6, 8 ⋯ |
| 2 | 3, 5, 7, 9 ⋯ |
| ⋮ | ⋮ |

FIG. 17

| SHIFTED AMOUNT (mm) | DATA NUMBER GROUP |
|---|---|
| 0 | 1, 3, 5, 7 ⋯ |
| 1 | 1, 4, 7, 10 ⋯ |
| 2 | 2, 3, 5, 8 ⋯ |
| ⋮ | ⋮ |

$$y = h - \frac{cx^2}{1+\sqrt{1-(k+1)c^2x^2}}$$

h: LENS THICKNESS 6 mm
c: LENS CURVATURE 0.1
k: ASPHERIC COEFFICIENT 1.3

DISPLAY APPARATUS WITH VIDEO DATA INTERPOLATION CIRCUITRY PREPARING POST-INTERPOLATION DATA BASED ON A LENS SHAPE AND DISPLAY METHOD

TECHNICAL FIELD

The present invention relates to a display apparatus and, in particular, to a display apparatus which includes a lens on a display surface, and a display method of the display apparatus.

BACKGROUND ART

Conventionally, there has been proposed a display apparatus which includes a convex lens in order to cause a joint to be inconspicuous (seamless display) in a tilling technology for enlarging a display area while causing the frame part of a liquid crystal display panel to be inconspicuous or arranging a plurality of liquid crystal display panels.

PTL 1 discloses a multi-projection type screen in which the joint of a screen is made inconspicuous. FIG. 23 is a view illustrating a principle of display using the multi-projection type screen disclosed in PTL 1.

As shown in FIG. 23, when a lens-shaped screen is arranged at the joint part of the projection-type display, from among of light 208 emitted from the lens, light 209, emitted from the screen toward the left side in the vicinity of the joint as shown in the drawing, is refracted by the lens-shaped screen 207 and is emitted as parallel light. In contrast, light emitted from a right side part is emitted straight from the screen 202 without being affected because the lens-shaped screen 207 is flat at that part. In this manner, light which is apparently emitted from the joint due to a housing 201 is generated.

The emitted light 208 is light which is received by a person who watches the screen. Therefore, the joint is seen by an observer in such a way that the width 210 of an actual joint becomes an apparent width 211 due to the effect of the lens-shaped screen 207, and thus the joint seems to be narrow. In this manner, the joint part of the projection-type display is caused to be inconspicuous.

In addition, PTL 2 discloses a display apparatus in which the expansion display of pixels is suppressed when a convex lens is provided on the display surface of a display, and, further, a display apparatus in which the generation of expansion display due to the visual field angle of an observer is suppressed.

CITATION LIST

Patent Literature

PTL 1: Japanese Unexamined Patent Application Publication No. 2000-180964
PTL 2: International Publication No. WO2011/067996

SUMMARY OF INVENTION

Technical Problem

However, when a convex lens is used as in the conventional display apparatus, the shape of the convex lens changes according to the operating environment of the display apparatus. More specifically, the convex lens expands or contracts according to temperature under the operating environment. Further, the curved surface shape of the convex lens changes.

In the multi-projection type screen of PTL 1 and the display apparatus of PTL 2, the change in the shape of the convex lens is not assumed. Therefore, when the shape of the convex lens changes, it is difficult to effectively cause the joint part to be inconspicuous or to suppress expansion display.

The present invention is made to solve the above problems, and an object of the present invention is to provide a display apparatus and a display method capable of suppressing expansion and contraction of a display image which occur in association with a change in the shape of a lens in the display apparatus which includes the lens on a display surface.

Solution to Problem

In order to solve the above problems, according to an aspect of the present invention, there is provided a display apparatus that includes a display unit and a lens which covers a display surface of the display unit, the display unit including pixels arranged in a matrix shape, the lens including a curved surface range in which a surface of the lens is a convex curved surface, and that displays an image based on video data corresponding to the respective pixels, the display apparatus including: a video data interpolation unit to which original video data that are the video data are input, which prepares interpolation video data that are the video data having gradations between gradations of the original video data of pixels which are adjacent to each other, which arranges the original video data in order of corresponding pixels, and which prepares post-interpolation video data that are the video data corresponding to the number of the pixels and that are selected from the video data in which the original video data are combined with the interpolation video data when interpolation video data are arranged such that the gradations are continued between the original video data of the corresponding pixels; and an acquisition unit that acquires a deviation amount, in which a measurement position on the lens is displaced from a reference position acquired before the change of the shape, in association with a change in a shape of the lens, and the video data interpolation unit prepares the post-interpolation video data based on the deviation amount.

In addition, in order to solve the above problems, according to another aspect of the present invention, there is provided a display method of a display apparatus that includes a display unit and a lens which covers a display surface of the display unit, the display unit including pixels arranged in a matrix shape, the lens including a curved surface range in which a surface of the lens is a convex curved surface, and that displays an image based on video data corresponding to the respective pixels, the display method including: a step of, when it is assumed that the video data which originally correspond to the respective pixels are set to original video data, preparing interpolation video data that are the video data having gradations between gradations of the original video data of pixels which are adjacent to each other, arranging the original video data in order of corresponding pixels, and preparing post-interpolation video data that are the video data corresponding to the number of the pixels and that are selected from the video data in which the original video data are combined with the interpolation video data when the interpolation video data are arranged such that the gradations are continued between the original video data of the corresponding pixels; and a step of acquiring a deviation amount, in which a measurement position on the lens is displaced from a reference position acquired before the change of the shape, in association with a change in a shape of the lens, and the step of preparing the post-interpolation video data includes preparing the post-interpolation video data based on the deviation amount.

Advantageous Effects of Invention

According to an aspect of the present invention, in a display apparatus which includes a lens on a display surface, there is an advantage that it is possible to suppress the expansion and contraction of a display image, which occur in association with the change in the shape of the lens.

BRIEF DESCRIPTION OF DRAWINGS

FIG. 16 is a view illustrating an example of a data selection LUT according to the embodiment of the present invention.

FIG. 17 is a view illustrating another example of the data selection LUT according to the embodiment of the present invention.

DESCRIPTION OF EMBODIMENTS

Hereinafter, embodiments of the present invention will be described in detail with reference to the accompanying drawings.

First Embodiment

Figure 1:
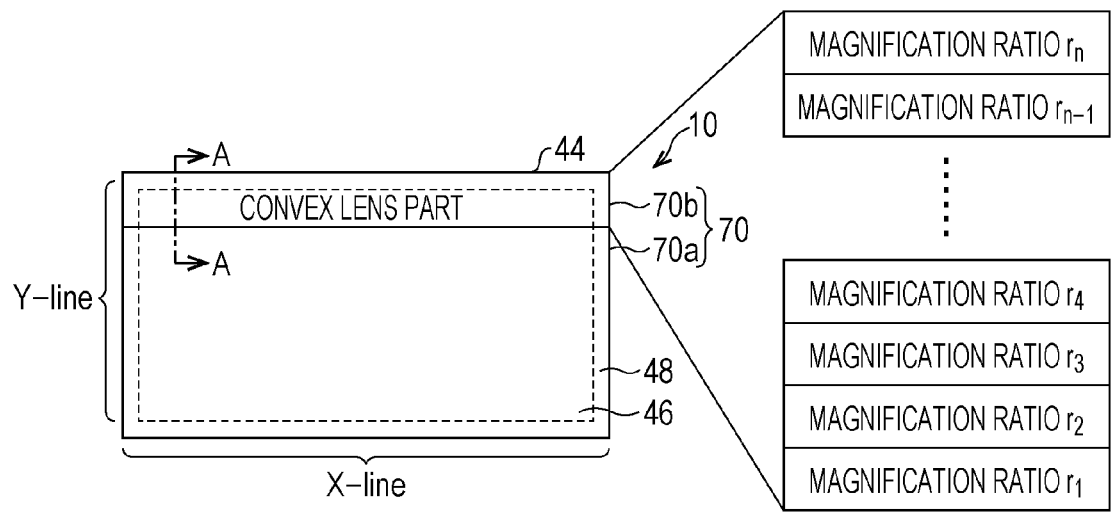
FIG. 1 is a view illustrating a display apparatus according to the present invention viewed from the display surface thereof.
Figure 2:
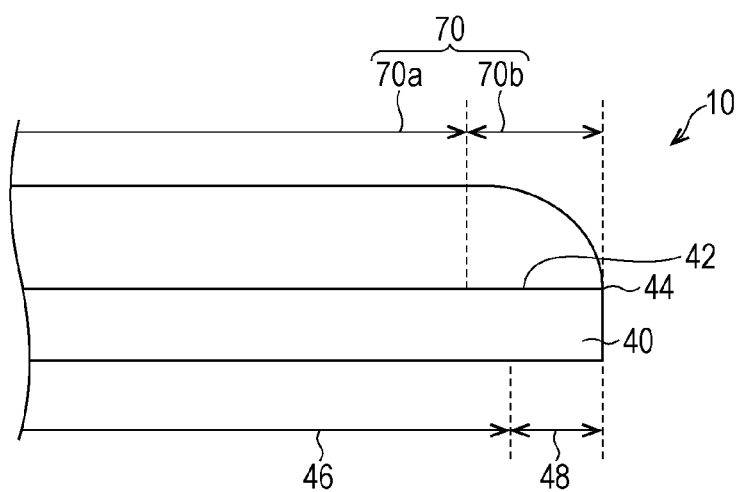
FIG. 2 is a cross-sectional view taken along line A-A of FIG. 1.

An embodiment of the present invention will be described with reference to FIGS. 1 to 18 as below.
(Display Apparatus)
FIG. 1 is a view illustrating a schematic configuration when a liquid crystal display apparatus according to the embodiment is viewed from the display surface thereof. FIG. 2 is a cross-sectional view taken along a line A-A of FIG. 1.

As shown in FIG. 1, a liquid crystal display apparatus 10 as the display apparatus according to the embodiment includes a display surface which is covered by a lens 70 as an optical section.

The lens 70 is provided with a plane surface range 70a which has a plane surface, and a curved surface range 70b which has a surface curved in a convex shape and functions as a convex lens. Further, the curved surface range 70b is arranged along a first long side which is one side of four edge sides of a rectangular display surface.

Description will be made with reference to FIG. 2 which illustrates the cross section. As shown in FIG. 2, the liquid crystal display apparatus 10 includes a liquid crystal display panel 40 as a display unit, and a lens 70 which is provided on the display surface 42.

In the liquid crystal display panel 40, pixels (not shown in the drawing) are arranged in a matrix shape and lines which are orthogonal to each other are formed by the pixels.

Further, the curved surface range 70b of the lens 70 is arranged at the vicinity part of the edge side 44 of the liquid crystal display panel 40.

In addition, the display surface 42 includes a display area 46 in which a video or the like is displayed, and a non-display area 48 such as so-called a frame that is an area in which a video or the like is not displayed. Further, the lens 70 includes the curved surface range 70b which is arranged to cover the display area 46 or the non-display area 48.

Meanwhile, in FIGS. 1 and 2, the configuration, in which the curved surface range 70*b* is provided along one long side of four edge sides of the display surface, has been described. Here, the position, the number, or the like of the curved surface range 70*b* in the lens 70 is not particularly limited. For example, it is possible to provide the curved surface range 70*b* along a narrow side. In addition, it is possible to provide the curved surface range 70*b* along not only a first edge side but also second to fourth edge sides.

In addition, the lens 70 does not necessarily include the plane surface range 70*a*. For example, it is possible to cause the entire lens 70 to include the curved surface range 70*b* without providing the plane surface range 70*a* to the lens 70.

(Overall Structure)

Figure 3:
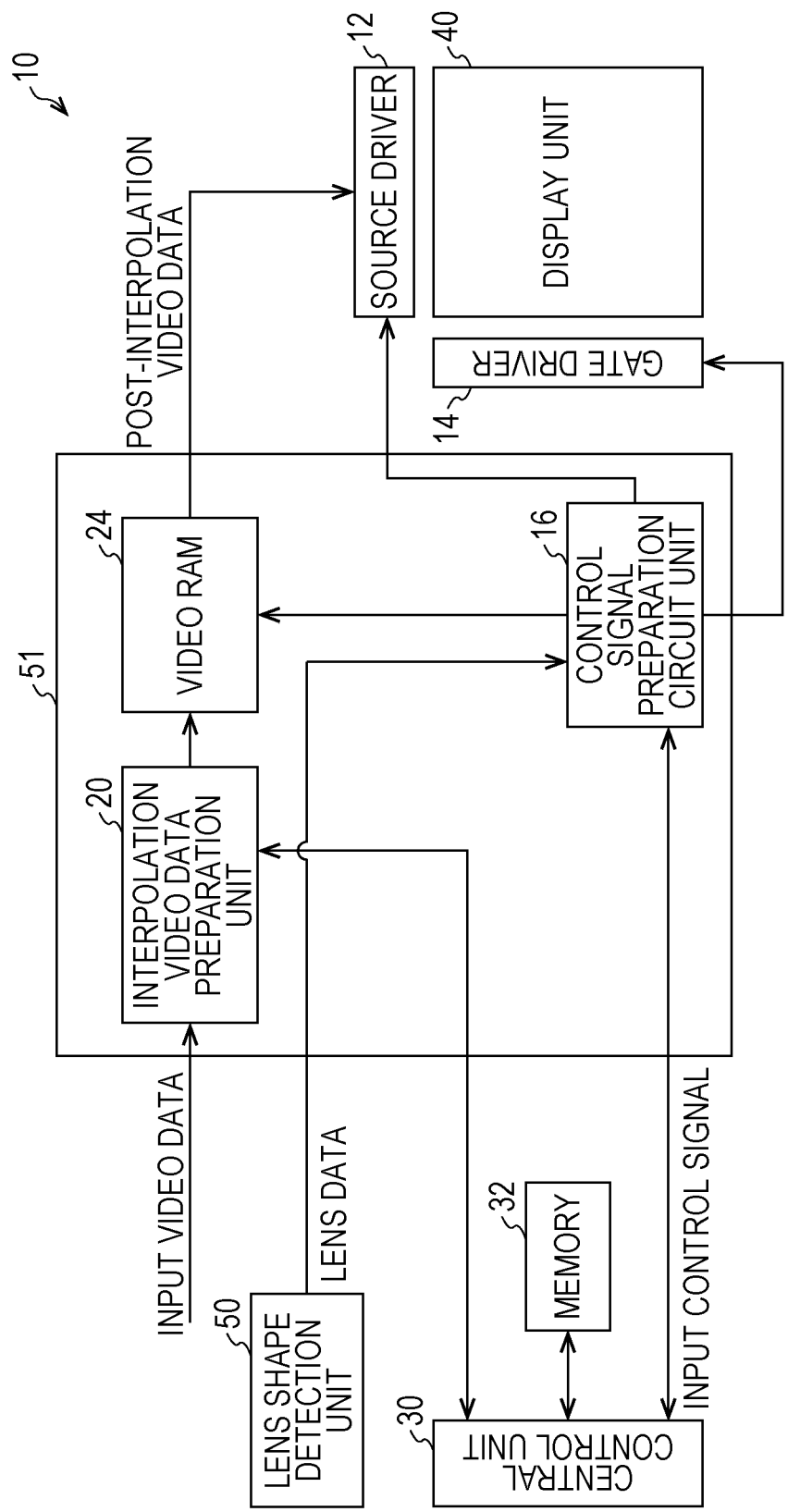
FIG. 3 is a view illustrating the schematic configuration of a liquid crystal display apparatus according to an embodiment of the present invention.

Subsequently, the overall structure of the liquid crystal display apparatus 10 according to the embodiment will be described with reference to FIG. 3. FIG. 3 is a view illustrating the schematic configuration of the liquid crystal display apparatus 10.

In the liquid crystal display apparatus 10 according to the embodiment, various control units and the like are provided in addition to the liquid crystal display panel 40 or the like as the display unit.

More specifically, as shown in FIG. 3, a source driver 12 and a gate driver 14 are provided around the liquid crystal display panel 40.

In addition, the liquid crystal display apparatus 10 according to the embodiment includes a lens shape detection unit 50 and a video data interpolation unit 51.

The lens shape detection unit 50 detects the shape of the lens 70, and prepares lens data. The lens data are input to the video data interpolation unit 51. The lens shape detection unit 50 will be described in detail later.

The video data interpolation unit 51 includes an interpolation video data preparation unit 20, a video RAM 24, and a control signal preparation circuit unit 16.

Original video data (original video data) are input to the video data interpolation unit 51. In addition, the video data interpolation unit 51 prepares post-interpolation video data based on the lens data, and outputs the video data to the source driver 12. Therefore, the liquid crystal display panel 40 displays a video according to the post-interpolation video data.

A detailed unit which prepares the post-interpolation video data since the original video data are input to the video data interpolation unit 51 will be described later.

Here, the original video data (video data which originally correspond to respective pixels) means video data which are originally input to the respective pixels, and, more specifically, means video data which are input to correspond to the respective pixels in, for example, a normal display apparatus in which the optical section is not provided.

The video RAM 24, which is provided in the video data interpolation unit 51, stores the video data which is supplied to the source driver 12. Further, the interpolation video data preparation unit 20 is connected to the video RAM 24.

In the interpolation video data preparation unit 20, interpolation video data, which will be described later, are prepared. Further, input video data, which are original video data, and the interpolation video data are stored in the video RAM 24.

Further, the video data (original video data and interpolation video data), which are stored once, are output from the video RAM 24 and supplied to the source driver 12.

In addition, the control signal preparation circuit unit 16, which is provided in the video data interpolation unit 51, controls the source driver 12, the gate driver 14, and the video RAM 24.

The lens data are input to the control signal preparation circuit unit 16. The control signal preparation circuit unit 16 also functions as a data selection unit which selects video data (selects reduction video data) to be supplied to the source driver 12 from the video data which are stored in the video RAM 24 based on the lens data.

Further, an input control signal, which is a signal for controlling the control signal preparation circuit unit 16, is input to the control signal preparation circuit unit 16.

Further, the liquid crystal display apparatus 10 is provided with a memory 32 in which a display control program for executing the control or the like is stored, and a central control unit 30 which is connected to the memory 32.

Further, the central control unit 30 controls the control signal preparation circuit unit 16 through the input control signal, and controls the interpolation video data preparation unit 20.

(Display Method)

Hereinafter, sequentially, a basic display method in the liquid crystal display apparatus according to the embodiment will be described.

(Magnification Ratio)

Figure 6:
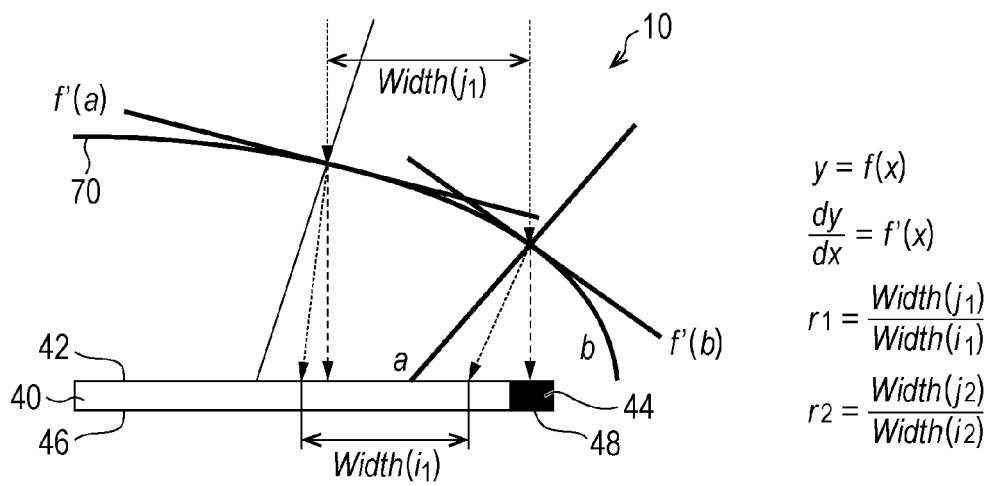
FIG. 6 is a view illustrating the situation of enlargement of display due to a lens according to the embodiment of the present invention.

FIG. 6 is a view illustrating the situation of enlargement of the lens 70.

In FIG. 6, Width(in) expresses the width of a line zone (the length of the display surface) when viewed from the normal line direction of the display surface 42.

In addition, Width(jn) expresses the width of a line zone (the length of the display surface) when the Width(in) is displayed through the lens 70.

Further, Width(jn)/Width(in) is a magnification ratio rn with regard to the line zone. That is, a ratio, in which a video is enlarged when the video is transmitted through the lens 70 functioning as the optical section, is acquired.

Further, the magnification ratio rn differs according to a method of curve (curved surface shape) of the lens 70. Therefore, as shown in previously described FIG. 1, the magnification ratio rn differs for each line from the boundary of the plane surface range 70*a* and the curved surface range 70*b* to the edge side 44.

(Enlargement Width)

Subsequently, the enlargement width of the line zone according to the lens 70 will be described.

The enlargement width l of the line zone according to the lens 70 is expressed as Width(jn)−Width(in).

Further, the enlargement width l in the entire area of the curved surface range 70*b* is a value acquired by adding the "Width(jn)−Width(in)" to the entire area as Equation shown in FIG. 6.

Meanwhile, f(x) in FIG. 6 expresses a function which indicates the surface shape of the lens 70 and f'(x) expresses the slope of f(x).

In addition, f'(a) and f'(b) in FIG. 6 respectively express the slopes of the surface of the lens 70 in positions a and b.

(Change in Shape of Lens)

The lens 70 is provided to cover the display surface 42 of the liquid crystal display panel 40 as described above.

The lens 70 expands (stretches) or contracts according to the operating environment of the liquid crystal display apparatus 10. That is, the shape of the lens 70 changes according to the operating environment of the liquid crystal display apparatus 10.

Figure 4:
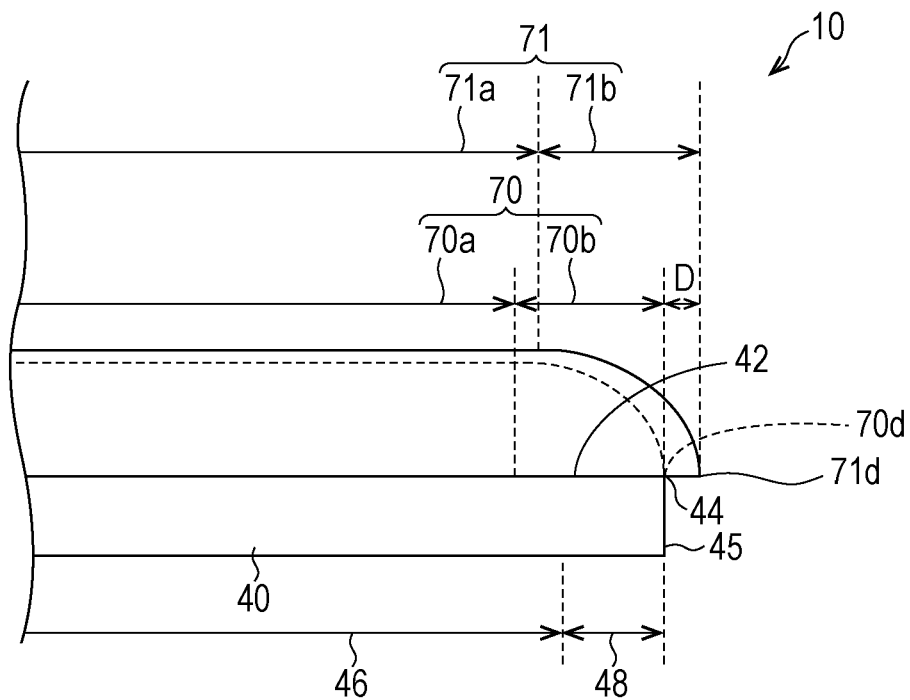
FIG. 4 is a cross-sectional view taken along a line A-A of FIG. 1 and is a view illustrating the shape of a lens before and after the shape of the lens changes.

FIG. 4 is a cross-sectional view illustrating a part of the liquid crystal display apparatus 10 including a lens 71, the shape of which changes, and is a view corresponding to FIG. 2. The lens 71 is acquired when the shape of the lens 70 changes, and the lens 70 acquired before the shape thereof does not change in an initial state is expressed using a broken line.

The shape of the lens 71 shown in FIG. 4 changes when the dimension thereof is enlarged in the width direction. As is clear when compared to the shape of the lens 70 acquired before the shape thereof changes, the shape of the curved surface range 71b (curved surface shape or R shape) also changes.

Meanwhile, when the curved surface shape of the lens 70 changes, the magnification ratio rn and the enlargement width l change in association therewith. That is, in FIG. 4, when the shape of the lens 70 changes and becomes the lens 71, the curved surface shape changes, and thus the Width(jn) in FIG. 6 changes and becomes Width(kn).

Therefore, the magnification ratio rn changes from Width (jn)/Width(in) to Width(kn)/Width(in) in accordance with the change in the shape of lens.

In addition, the enlargement width l changes from Width (jn)−Width(in) to Width(kn)−Width(in) in accordance with the change in the shape of lens.

Therefore, if the curved surface shape of the lens changes, a video to be displayed changes before and after the curved surface shape changes even though an attempt is made to display the same video before and after the curved surface shape changes. In other words, even if the same video data are input to the source driver before and after the curved surface shape changes, a video to be displayed changes before and after the curved surface shape changes.

It is possible to form the lens 70 according to the embodiment using, for example, glass, acryl, polycarbonate, or the like. Under the operating environment of the liquid crystal display apparatus 10, the amount of the change in the shape of the lens 70 differs according to the raw material thereof. More specifically, the amount of the change in the shape of the lens 70 is based on the coefficient of thermal expansion (/° C.) of the raw material.

Figure 5:
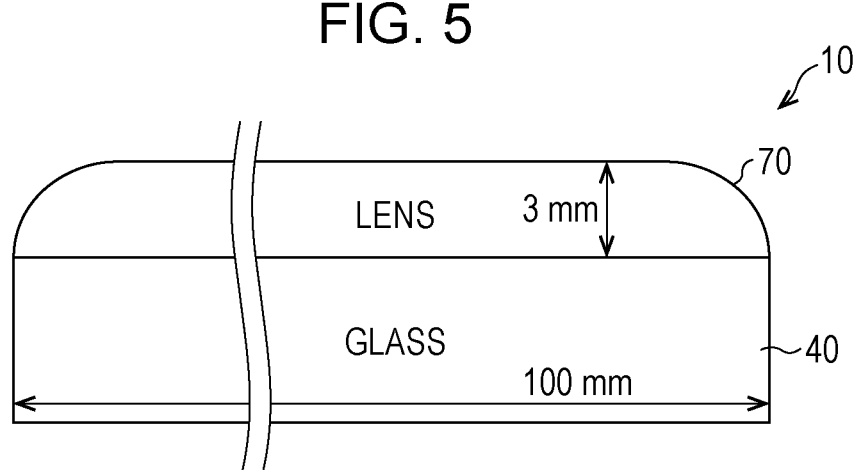
FIG. 5 is a view illustrating an example of the cross section of a liquid crystal display apparatus according to the embodiment of the present invention.

FIG. 5 is a cross-sectional view illustrating the liquid crystal display apparatus 10 as an example. The width of each of the liquid crystal display panel 40 and the lens 70 of the liquid crystal display apparatus 10 shown in FIG. 5 is 100 mm and the thickness of the lens 70 is 3 mm.

Here, the coefficient of thermal expansion of glass is $0.8 \times 10^{-5}$/° C., the coefficient of thermal expansion of acryl is $7 \times 10^{-5}$/° C., and the coefficient of thermal expansion of polycarbonate is $7 \times 10^{-5}$/° C.

Therefore, when acryl or polycarbonate is used as the lens 70 in the liquid crystal display apparatus 10 shown in FIG. 5, the lens 70 extends by approximately 0.14 mm in the width direction if the temperature of the lens 70 rises by 20° C.

In particular, the ends of the lens 70 have the shape of the convex lens and are thinner than the central part thereof, thereby easily extending. For example, when the temperature of the lens 70 rises by 20° C., there is a case in which the ends of the lens 70 extend by approximately 1 mm in actual measurement.

(Lens Shape Detection Unit)

The lens shape detection unit 50 according to the embodiment will be described with reference to FIG. 4.

As described above, the shape of the lens 70 changes according to the operating environment of the liquid crystal display apparatus 10. The lens shape detection unit 50 according to the embodiment detects the shape of the lens 70, and prepares the lens data indicative of information about the shape of the lens.

The lens shape detection unit 50 according to the embodiment includes an acquisition unit which is not shown in the drawing.

The acquisition unit acquires the deviation amount of the lens 70, which is the displacement amount of a measurement position, from a reference position. For example, it is possible to make setting such that the measurement position is one end of the lens and the reference position is the end 70d of the lens 70 in an initial state before the shape of the lens changes.

In this case, the end 71d of the lens 70, which is acquired after the shape at the measurement position changes, is displaced from the end 71d of the lens 70 which is the reference position, by a distance D. The distance D is the deviation amount in accordance with the change in shape.

The lens shape detection unit 50 measures the deviation amount and outputs the deviation amount to the video data interpolation unit 51 as the lens data.

It is possible to use a distance measurement sensor as the acquisition unit. Therefore, it is possible to automatically measure the deviation amount. In addition, it is possible to use a clearance gauge as the acquisition unit. In this case, an observer may manually measure the deviation amount using the clearance gauge and may feedback the result of measurement as the lens data.

Meanwhile, although a video to be displayed on the display surface 42 of the liquid crystal display panel 40 changes in association with the change in the shape of the lens 70, this is mainly based on the change in the curved surface shape of the lens.

Therefore, it is further preferable to detect the change in the curved surface shape of the lens 70 and to set (the amount of change in) the curved surface shape to the lens data.

Here, when the shape of the lens 70 changes, the curved surface shape changes in a regular relationship with the deviation amount. Therefore, it is possible to calculate the change in the curved surface shape based on the deviation amount.

However, since a method of fixing the lens 70 also affects the amount of change in the curved surface shape, the relationship between the deviation amount and the curved surface shape is not simple. Therefore, the liquid crystal display apparatus 10 may include an LUT which is previously associated with the relationship between the deviation amount, acquired when the shape of the lens changes, and the change in the curved surface shape.

(Video Ram)

Subsequently, the capacity of the video RAM 24 will be described. The video RAM 24 stores the video data, and the video data includes original video data, which is initial video data, and interpolation video data which is prepared in addition to the original video data. That is, the video RAM 24 is configured as a RAM which stores video data for performing up-conversion on a video.

Further, it is possible to calculate the approximate capacity of the video RAM 24, which is necessary for storing the video data, based on the number of enlargement lines to be added. Further, it is possible to calculate the number of enlargement lines to be added using the following Equation.

The number of enlargement lines to be added=enlargement width/pixel pitch(line pitch)

When the convex lens, which is curved in the vertical line direction with regard to the liquid crystal display panel 40, is used as the lens 70, a video enlarges to some extent due to the lens diameter of the lens 70. Further, when a width corresponding to the enlarged video is calculated as an enlargement width and the enlargement width is divided by the length of the pixel pitch, the number of enlargement lines to be added is acquired. Meanwhile, when the enlargement width is expressed from a point of view of the length of the display surface, enlargement width is the difference between the length of the display surface 42 which faces the curved surface range 70b and the length of the display surface 42 which faces the curved surface range 70b viewed through the lens 70.

Figure 7:
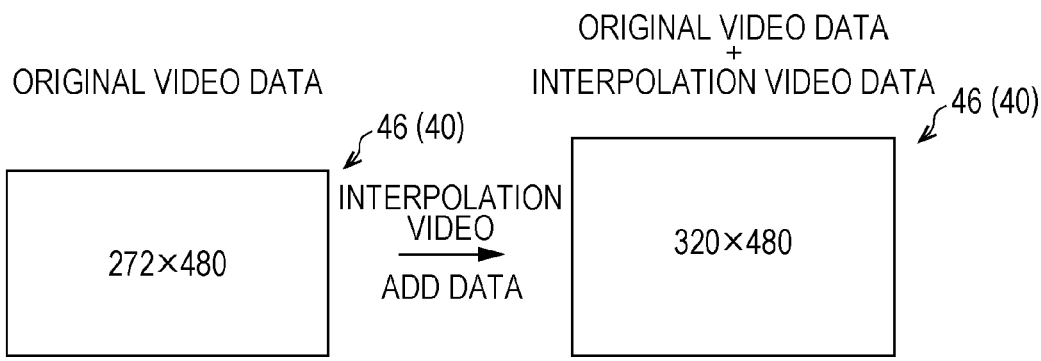
FIG. 7 is a view illustrating the enlargement of a display area according to the embodiment of the present invention.

More specifically, for example, as shown in FIG. 7, when the liquid crystal display panel 40, which includes the display area 46 having 272 vertical lines and 480 horizontal lines, is enlarged by the convex lens and the number of lines after the enlargement is 320, the liquid crystal display panel 40 changes as below.

In this case, the difference between 320 lines and 272 lines, that is, 52 lines, is the number of enlargement lines to be added. Further, it is possible to determine the capacity of the video RAM 24 based on the number of enlargement lines to be added.

More specifically, when R·G·B of 8 gradations are displayed, it is understood that the video RAM 24, which has a capacity of the number of bits calculated by 52 (the number of enlargement lines)×480 (the number of horizontal lines)×8 (the number of gradation bits)×3 (R·G·B), is necessary.

(Interpolation Video Data)

Subsequently, the interpolation video data will be described. Here, the interpolation video data are video data prepared to fill a part enlarged due to the lens 70 together with the original video data.

In other words, the interpolation video data are data prepared in a pseudo manner in order to arrange the video data in almost the same line zone with regard to the display area which is enlarged due to the act of the lens 70. If the interpolation video data are added to the original video data, the video data are prepared by almost the same density as a part corresponding to the plane surface range 70a even in a part corresponding to the curved surface range 70b of the lens 70 even though the enlargement width is generated due to the lens 70.

Figure 8:
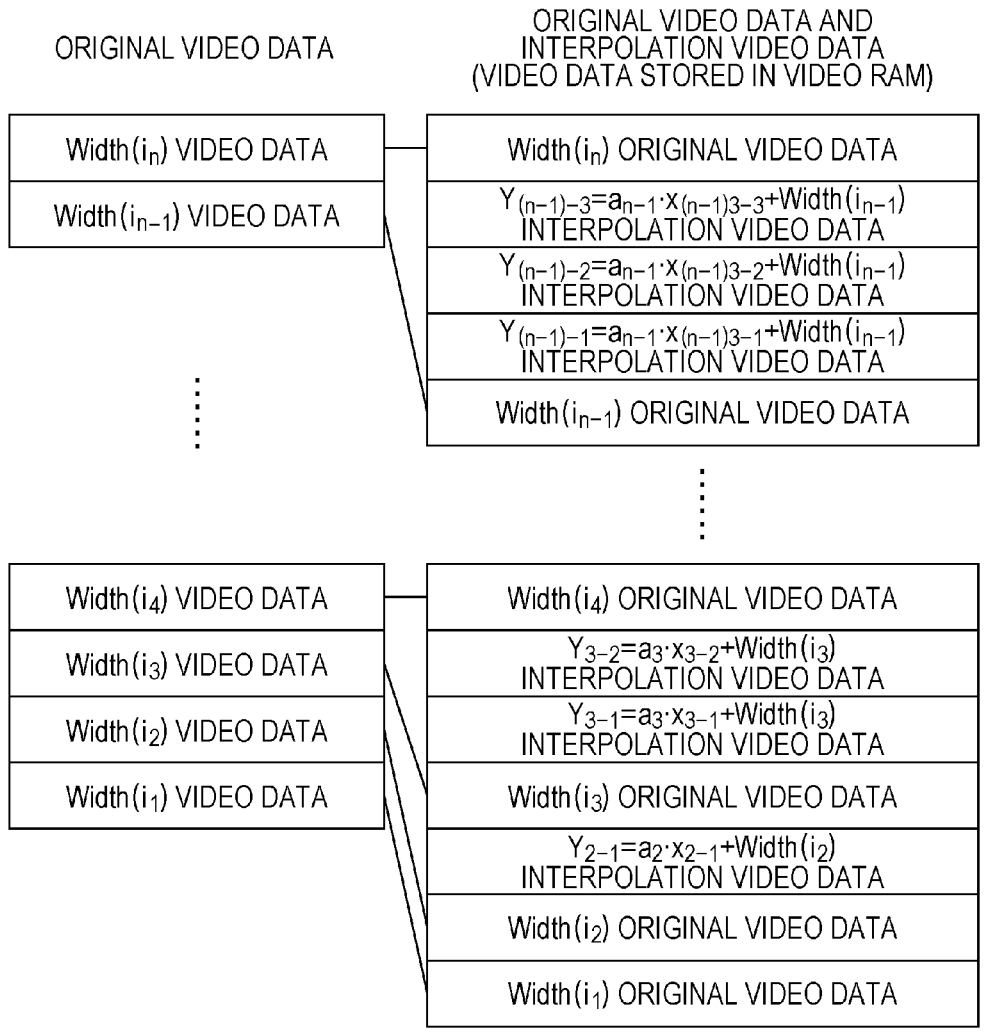
FIG. 8 is a view illustrating original video data and interpolation video data according to the embodiment of the present invention.
Figure 9:
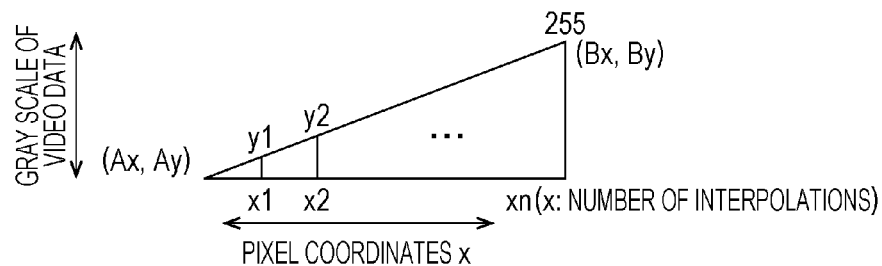
FIG. 9 is a view illustrating the overview of interpolation video data preparation according to the embodiment of the present invention.

Hereinafter, the interpolation video data will be described in detail with reference to FIGS. 8 and 9. FIG. 8 is a view illustrating original video data and the interpolation video data. In FIG. 8, a left side column indicates the original video data and a right side column indicates the original video data and the interpolation video data. In addition, FIG. 9 is a view schematically illustrating the overview of the interpolation video data preparation.

In the description below, a case, in which the interpolation video data are prepared as video data which have gradations positioned between gradations of the original video data of pixels which are adjacent to each other in a direction in which the curved surface of the curved surface range 70b of the lens 70 curves, is described as an example.

Here, the pixels, which are adjacent in the direction in which the curved surface of the curved surface range 70b curves, means pixels which are adjacent along a direction which faces from the starting end of the curve of the curved surface (boundary of the plane surface range 70a and the curved surface range 70b) to the end of the curve when the curved surface of the curved surface range 70b of the lens 70 is viewed from a side.

Further, various methods are conceivable as a method of preparing the interpolation video data. Hereinafter, the method of preparing the interpolation video data using a linear function will be described.

In FIG. 9, a horizontal axis indicates the coordinates of a pixel and a vertical axis indicates the brightness (gradations) of the video data. That is, it is possible to expresses a pixel A, in which the coordinates are x and the gradation is y, as (Ax, Ay).

Further, FIG. 9 shows the overview of a case in which the interpolation video data having the number of interpolations x is acquired between the pixel A (Ax, Ay) and a pixel B (Bx, By).

That is, when setting is made such that reference data are (Ax, Ay) and (Bx, By) and the number of interpolations is x, the gradations y of the interpolation video data are expressed as below.

$$Y=ax+Ay : a=(By-Ay)/x$$

Further, the gradations of n-th interpolation video data are expressed as below.

$$y_n=ax_n+Ay$$

As above, the interpolation video data are prepared to correspond between the pixels which are adjacent to each other. In addition, the interpolation video data are prepared as the video data having a gradation of a value which is acquired by adding the integral multiple of a value, which is acquired by equally dividing the difference between the respective gradation values by the number acquired by adding 1 to the number of interpolations, to a smaller gradation value of the respective gradation values of the original video data of two pixels which are adjacent to each other.

Further, when a plurality of interpolation video data are prepared between a pair of adjacent pixels, the gradations of the prepared interpolation video data are values which continuously increase or decrease in stages between the gradation of the original video data of one of the adjacent pixels to the gradation of the original video data of the other pixel.

The interpolation video data, which are acquired using the Equation, is stored in the video RAM which has been previously described.

(Method of Acquiring Number of Interpolations)

Here, a method of acquiring the number of interpolations when the interpolation video data are prepared will be described. Various methods are conceivable as the method of acquiring the number of interpolations.

(First Method)

First, a first method is a method of adding the number of interpolations whenever Width(jn)−Width(in)≥1.

Figure 10:
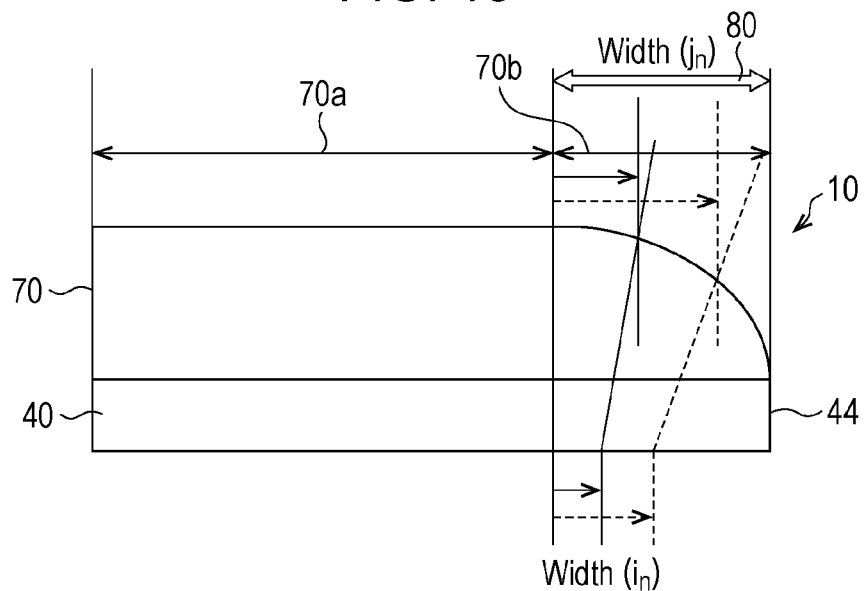
FIG. 10 is a view illustrating a method of acquiring the number of interpolations according to the embodiment of the present invention.
Figure 11:
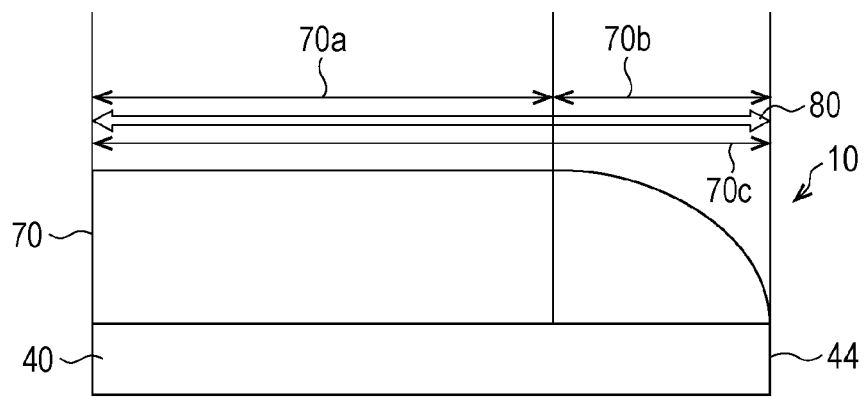
FIG. 11 is a view illustrating a range, in which the interpolation video data are prepared, according to the embodiment of the present invention.

Description will be made with reference to FIG. 10. FIG. 10 is a view illustrating the first method of acquiring the number of interpolations.

As shown in FIG. 10, in the first method, when the Width(in) is enlarged while being segmented in the direction of the edge side 44 from a position corresponding to the boundary of the plane surface range 70a and the curved surface range 70b on the display surface of the liquid crystal display panel 40, the number of interpolations increases by one whenever Width(in)−Width(jn) exceeds the width of 1 line zone, that is, pixel pitch.

Meanwhile, in the method, the curved surface range 70*b* is an interpolation video data preparation range 80 which is a range in which the interpolation video data are prepared.

According to the method, since the interpolation video data are prepared according to a ratio at which the video is enlarged, it is easy to cause the density of the video data in which the original video data are combined with the interpolation video data, which corresponds to the length of the display surface of the display unit, which is viewed through the optical section, to be at the same degree as the density of the original video data, which corresponds to the length of the display surface of the display unit.

In addition, according to the method, it is possible to prepare the interpolation video data by a necessary density at a part in which the interpolation video data are necessary. Therefore, it is possible to reduce the number of interpolation video data to be prepared.

In addition, since it is possible to suppress the number of interpolation video data, it is possible to suppress the capacity of the video RAM 24.

(Second Method)

A second method is a method of evenly preparing the interpolation video data using the number of interpolations (the number of steps).

In the first method, the number of interpolation video data to be prepared differs at every line interval. In contrast, in the second method, the number of interpolation video data to be prepared is uniform at every line interval.

Further, the number of interpolation video data to be prepared (the uniform number) is determined based on a ratio at which a video from the pixels enlarges after penetrating through the curved surface range 70*b* of the lens 70.

In addition, in the first method, a case in which the interpolation video data are prepared at only a part corresponding to the curved surface range 70*b* of the lens 70 in the display area 46, is shown as an example.

In contrast, in the description below, a case in which the interpolation video data are prepared at a part corresponding to the plane surface range 70*a* in addition to the part corresponding to the curved surface range 70*b* in the display area 46, is shown as an example. That is, as expressed in FIG. 11 which shows a range in which the interpolation video data are prepared, the interpolation video data are prepared in the entire range 70*c* which includes the plane surface range 70*a* and the curved surface range 70*b* of the lens 70. That is, the entire range 70*c* is the interpolation video data preparation range 80.

Figure 12:
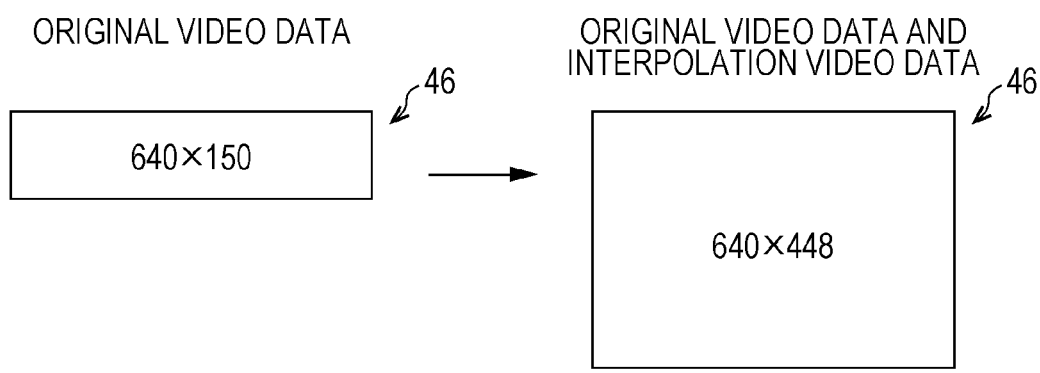
FIG. 12 is a view illustrating the method of acquiring the number of interpolations according to the embodiment of the present invention.

FIG. 12 shows an example in which the interpolation video data are prepared using the second method.

In the example, the interpolation video data are prepared over the entire range of the display area 46 by the same number at every line interval. More specifically, in the example, the number of interpolations is uniformly 2 over the entire range of the display area 46 using a lens, in which a maximum magnification ratio is similar to the integer of 2, as the lens 70.

That is, in the example, the number of interpolation video data, which is determined based on the ratio at which the video from the pixels enlarges after penetrating through the curved surface range 70*b* of the lens 70, is 2.

The display area 46 shown on the left side of FIG. 12 shows a display area 46 having the number of pixels 640×150 as an example. In this case, the number of lines of the original video data is 150.

Further, the display area 46 shown on the right side of FIG. 12 shows a pseudo display area 46 in a case in which the original video data are combined with the interpolation video data. That is, when 2 interpolation video data are prepared at every line interval, the number of interpolation video data to be prepared is (150−1)×2=298.

Therefore, the sum of the original video data and the interpolation video data are 448.

Further, a display area 46 having 448 lines is the display area 46 shown on the right side of FIG. 12.

Meanwhile, the example shows an example in which the interpolation video data are prepared between lines in the row direction. In the example, the interpolation video data are not prepared between lines in the column direction.

According to the method, it is possible to prepare the interpolation video data without performing complicated calculations. Therefore, it is possible to prepare the interpolation video data with a simple operation circuit.

(Interpolation Video Data Preparation Range)

Subsequently, the range in which the interpolation video data are prepared will be described. Various ranges are conceivable as the range in which the interpolation video data are prepared.

(Only Curved Surface Range)

In the first method, an example, in which the interpolation video data are prepared in the range of the edge side 44 of the liquid crystal display panel 40 from the boundary of the plane surface range 70*a* and the curved surface range 70*b* in the display area 46, has been shown.

According to the example, since it is possible to suppress the number of interpolation video data to be prepared to a necessary limit, it is possible to suppress the capacity of the video RAM 24.

(Entire Range)

In addition, in the second method, an example in which the interpolation video data are prepared in the entire range of the display area 46 has been shown.

(Partial Plane Surface Range and Curved Surface Range)

Various ranges are conceivable in addition to the two examples with regard to the range in which the interpolation video data are prepared.

For example, it is possible to prepare the interpolation video data in a range over the entire range of the curved surface range 70*b* and the partial range of the plane surface range 70*a*.

Figure 13:
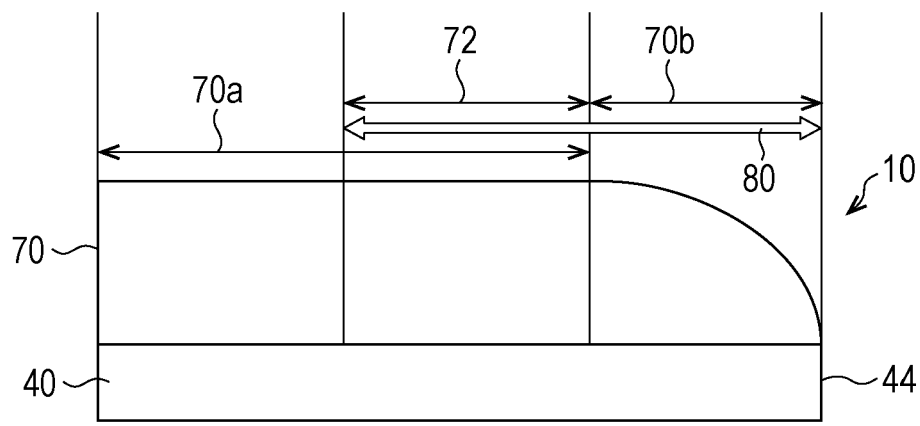
FIG. 13 is a view illustrating the range, in which the interpolation video data are prepared, according to the embodiment of the present invention.
Figure 14:
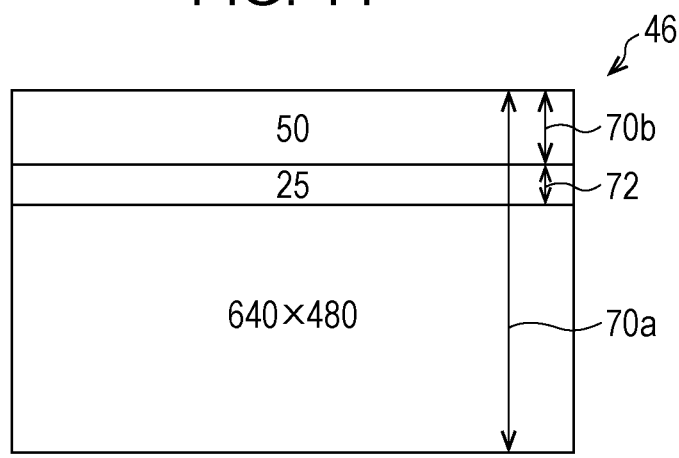
FIG. 14 is a view illustrating the range, in which the interpolation video data are prepared, according to the embodiment of the present invention.

Description will be made with reference to FIGS. 13 and 14. FIGS. 13 and 14 are views illustrating the range in which the interpolation video data are prepared.

In an example shown in FIG. 13, the interpolation video data are prepared in the curved surface range 70*b* and an additional plane surface range 72 which is a partial range of the plane surface range 70*a* and a range which is continued from the curved surface range 70*b*. That is, a range in which the curved surface range 70*b* is combined with the additional plane surface range 72 (boundary vicinity range) is the interpolation video data preparation range 80.

Here, the size of the additional plane surface range 72 is not particularly limited. For example, it is possible to make the size the additional plane surface range 72 be approximately the half of the size of the curved surface range 70*b*.

Description will be made in detail with reference to FIG. 14. FIG. 14 shows the display area 46 which includes the number of pixels of 640×480. In this case, when the number of lines in the horizontal direction of the range of the curved surface range 70*b* is 50 lines, it is possible to cause the size of the additional plane surface range 72 to be a size in which the number of lines in the horizontal direction of the range is approximately 25.

Meanwhile, the size of the additional plane surface range 72 is not limited to the size. For example, the additional plane surface range 72 may be set such that a larger number of lines are included therein.

As above, when the interpolation video data are prepared in the additional plane surface range 72, it is possible to suppress the disarrangement of the display, such as expansion display, in the vicinity of the boundary of the plane surface range 70a and the curved surface range 70b.

Meanwhile, when the interpolation video data preparation range 80 is set to the range shown in FIG. 13, the method of acquiring the number of interpolations is not particularly limited, and, for example, it is possible to use either the first method or the second method.

(Selection of Post-Interpolation Video Data)

Subsequently, the selection of the post-interpolation video data will be described. Here, the selection of the post-interpolation video data means the selection of the post-interpolation video data, which are the video data input to the source driver 12 and is used for actual display from the original video data and interpolation video data which are previously described based on FIG. 8. Further, it is possible to suppress expansion display due to the lens 70 through the selection of the post-interpolation video data (reduction video data).

The selection of the post-interpolation video data is performed in such a way that the control signal preparation circuit unit 16 selects (elects) the video data to be supplied to the source driver 12 from the video data stored in the video RAM 24.

The lens data are input to the control signal preparation circuit unit 16 according to the embodiment, and the control signal preparation circuit unit 16 selects the post-interpolation video data based on the lens data. Therefore, it is possible to select the post-interpolation video data based on a change in the shape of the lens, and the liquid crystal display apparatus 10 can perform display corresponding to the change in the shape of the lens.

The selection of the post-interpolation video data is performed based on the point of view below.

That is, in the curved surface range 70b, the number of video data which are necessary for display are selected from the entire video data arranged in order of the original video data and the interpolation video data. Here, the number necessary for the display means the number of lines.

To arrange in order of the original video data and the interpolation video data means to arrange the original video data in order of corresponding pixels and to arrange the interpolation video data between the original video data of the corresponding pixels such that the gradations thereof are continued.

Figure 15:
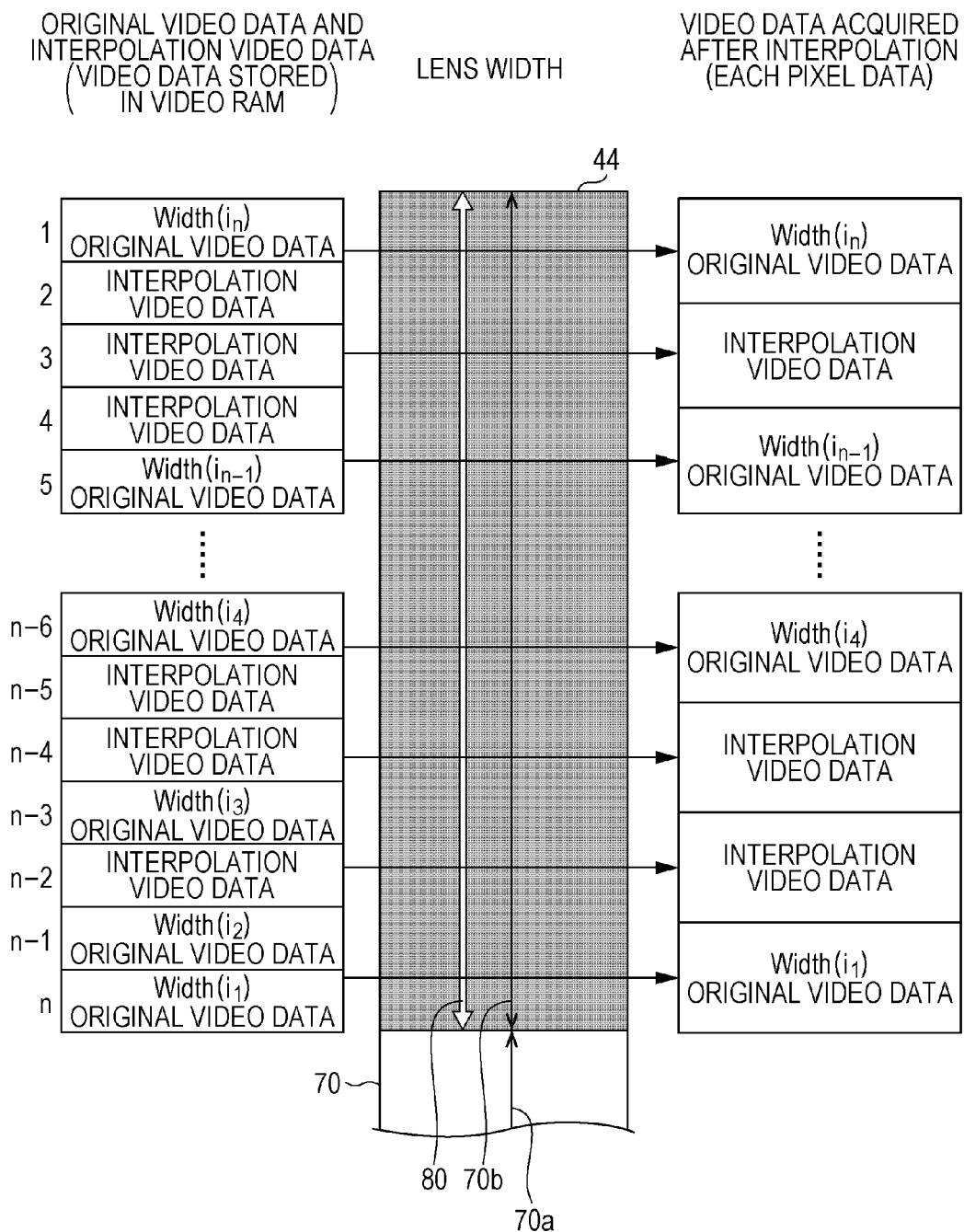
FIG. 15 is a view illustrating the selection of reduction video data according to the embodiment of the present invention.

Hereinafter, description will be made in detail with reference to FIG. 15. FIG. 15 is a view illustrating the selection of the post-interpolation video data, a left side column indicates the video data (video data group) in which the original video data are combined with the interpolation video data, and a right side column indicates the selected post-interpolation video data.

The interpolation video data shown in FIG. 15 is the same data as the interpolation video data previously described based on FIG. 8. That is, the interpolation video data preparation range 80 in the interpolation video data shown in FIG. 15 is the curved surface range 70b. Further, the interpolation video data are prepared based on the first method such that the number of interpolation video data prepared between adjacent lines increases toward the edge side 44 from the boundary of the plane surface range 70a and the curved surface range 70b.

Meanwhile, FIG. 15 shows an example in which the post-interpolation video data are selected such that, when the original video data and the interpolation video data are sequentially arranged, the selected post-interpolation video data are positioned at approximately equal intervals.

Further, in the embodiment, the number of video data which are necessary for display, that is, the post-interpolation video data, which are the video data having the same number of lines, are selected from the original video data and the interpolation video data.

Here, the liquid crystal display apparatus 10 according to the embodiment selects video data, to which numbers are attached based on the change in the shape of the lens 70, as the post-interpolation video data in a state in which the original video data and the interpolation video data are arranged in an order in which numbers are respectively attached.

That is, as shown in FIG. 15, a natural number starting from 1 is attached to the video data, acquired in such a way that the original video data and the interpolation video data are arranged, in the direction toward the boundary of the plane surface range 70a and the curved surface range 70b from the edge side 44.

Further, data numbers attached to the video data to be selected are prescribed according to the lens data, and the control signal preparation circuit unit 16 selects the video data, to which the data numbers corresponding to the respective lens data are attached, based on the lens data.

For example, as shown in FIG. 15, the control signal preparation circuit unit 16, to which specified lens data are input, selects video data to which data number, 1, 3, 5, (n−6), (n−4), (n−2), n, . . . which are prescribed according to the lens data are attached.

Hereinafter, description will be made using a detailed example.

The control signal preparation circuit unit 16 includes the data selection LUT in which a data number group including a plurality of data numbers is stored in association with the deviation amount as the lens data.

FIG. 16 shows an example of the data selection LUT.

In the example of FIG. 16, the lens data of a deviation amount 0 mm is associated with a data number group of 1, 3, 5, 7, . . . , the lens data of a deviation amount 1 mm is associated with a data number group of 2, 4, 6, 8, . . . , and the lens data of a deviation amount 2 mm is associated with a data number group of 3, 5, 7, 9, . . . .

Therefore, when lens data which includes information of the deviation amount 1 mm is input, the control signal preparation circuit unit 16, which includes the data selection LUT of FIG. 16, selects the video data, to which data numbers 1, 3, 5, 7, . . . are attached, from the video data in which the original video data and the interpolation video data are arranged.

In addition, when the lens data having the information of the deviation amount 0 mm is input, that is, when the shape of the lens does not change from an initial state, the control signal preparation circuit unit 16 selects video data, to which the data numbers 2, 4, 6, 8, . . . are attached, from the video data in which the original video data and the interpolation video data are arranged.

That is, it can be said that the position of the row of the video data, in which the original video data are combined with the interpolation video data, is associated with the deviation amount as the lens data and is stored in the data selection LUT.

Therefore, it is possible for the control signal preparation circuit unit 16 to select the video data in a position which is determined according to the deviation amount.

Meanwhile, FIG. 16 shows an example of the data selection LUT, in which the deviation amount having a gradation of 1 mm is associated with the data number group, as the data selection LUT. However, the present invention is not limited thereto. For example, an LUT, in which the deviation amount is more finely divided and, for example, the deviation amount having a gradation of 0.5 mm, are associated with the data number group, may be used.

In addition, when the data numbers included in the data number group are arranged in order of the sizes of numerical values indicated by the respective numbers, the difference in numerical values which are adjacent to each other is fixed to 2 in the data selection LUT of FIG. 16. However, the present invention is not limited thereto.

For example, it is possible to use a data selection LUT of FIG. 17. When the data numbers included in the data number group are arranged in order of the sizes of numerical values indicated by the respective numbers, the difference in numerical values which are adjacent to each other is not fixed to 2 in the data selection LUT of FIG. 17.

Therefore, according to the data selection LUT of FIG. 17, it is possible to select the post-interpolation video data by reducing the video data in such a way as to cause a reduction interval to be different according to the deviation amount in the video data in which the original video data and the interpolation video data are arranged.

Usually, when the change in the shape of the lens occurs, it is preferable that the change in a video to be displayed be less before and after the shape changes.

That is, when the original video data having the same gradations are input to the video data interpolation unit 51 before and after the change in the shape of the lens, it is preferable that the difference in gradations of the video to be displayed due to the respective post-interpolation video data be less before and after the change in the shape occurs.

Therefore, the control signal preparation circuit unit 16 selects optimum post-interpolation video data from the original video data and the interpolation video data such that the difference in the gradations of the videos to be displayed due to the respective post-interpolation video data before and after the change in the shape becomes the smallest with regard to the change in the curved surface shape when the change in the shape of the lens, which is expressed by the deviation amount, occurs.

Therefore, in the data selection LUT, the deviation amount is associated with the data number group for selecting the optimum post-interpolation video data.

Here, it is possible to almost measure the deviation amount according to actual operation environment temperature based on the coefficient of thermal expansion of the material of the lens and material thickness. Therefore, it is possible to easily construct a system by connecting the data selection LUT to a temperature sensor which can measure the environment temperature.

As an example, when a liquid crystal panel, in which a diagonal screen size is 4 inches and the number of pixels is 640×RGB×480, and an acryl lens, in which the coefficient of thermal expansion is $7 \times 10^{-5}/°$ C. and the maximum thickness is 3 mm, are used, it is possible to provide almost excellent videos by applying a data selection LUT to which the deviation amount under the respective environment is reflected for every gradation width of 10° C. within an actual operating environment temperature range of 0° C. to 60° C.

Meanwhile, since various factors, such as the screen size of the display apparatus, the number of pixels, pixel pitch, the coefficient of thermal expansion of a lens, and material thickness, exist, a data selection LUT to be actually prepared, a temperature range, or a temperature gradation width is not limited thereto.

According to the configuration, even if the change in the shape of the lens 70 occurs, the expansion and contraction of the display image (video) is suppressed based on the change in the shape by measuring the deviation amount and selecting the optimum post-interpolation video data based on the deviation amount.

Here, an example with regard to the lens 70 and the lens width will be described with reference to FIG. 18. The lens width is the length of a part in which the lens 70 has a curvature, and corresponds to the length of the curved surface range 70b.

Figure 18:
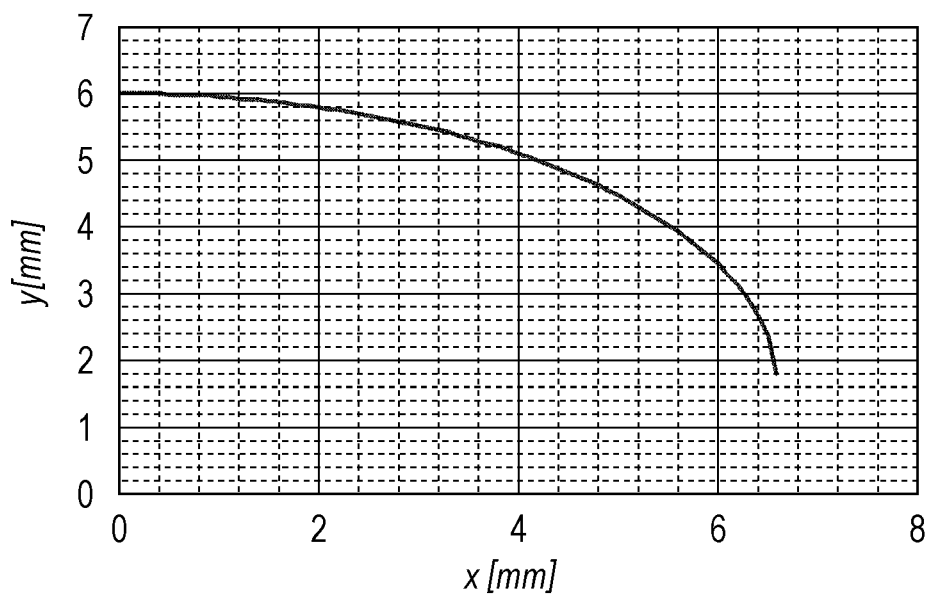
FIG. 18 is a view illustrating the relationship between a lens diameter and a lens width according to the embodiment of the present invention.

FIG. 18 is a view illustrating the relationship between the lens diameter and the lens width in the lens 70. Meanwhile, in a graph shown in FIG. 18, a horizontal axis indicates the lens width which is the length of the part in which the lens 70 has a curvature, and the vertical axis indicates the lens diameter.

FIG. 18 shows the lens 70, in which the thickness of the lens 70 (lens thickness) is 6 mm and the lens width is 6.5 mm, as an example.

Further, the relationship between the lens diameter and the lens width in the lens 70 is the relationship expressed in Equation shown in FIG. 18.

Here, when the lens 70 shown in FIG. 18 is used, the lens width of the lens 70 shown at the central column in FIG. 17 is 6.5 mm. Further, the curved surface range 70b in FIG. 17 is 6.5 mm. Since the curved surface range 70b is the interpolation video data preparation range 80 in the example shown in FIG. 17, the interpolation video data preparation range 80 is also 6.5 mm.

Meanwhile, in the description related to the selection of the post-interpolation video data, the selection of the post-interpolation video data in the curved surface range 70b has been described while presupposing a case in which the interpolation video data are prepared in only the curved surface range 70b.

Here, when the interpolation video data, described in the second method of acquiring the number of interpolations, are prepared at not only the part corresponding to the curved surface range 70b of the display area 46 but also the part corresponding to the plane surface range 70a, it is possible to perform the selection of the post-interpolation video data not in the plane surface range 70a but only in the curved surface range 70b. That is, in the plane surface range 70a, it is possible to use the original video data for display without change while the interpolation video data are prepared.

Accordingly, it is possible to easily calculate the interpolation video data, and it is possible to realize excellent display in the plane surface range 70a and the curved surface range 70b.

Second Embodiment

Another embodiment of the present invention will be described with reference to FIG. 19 as below. Meanwhile, for convenience of explanation, the same reference symbol is attached to a member, which has the same function as in the drawings described in the above embodiment, and the description thereof will not be repeated.

Figure 19:
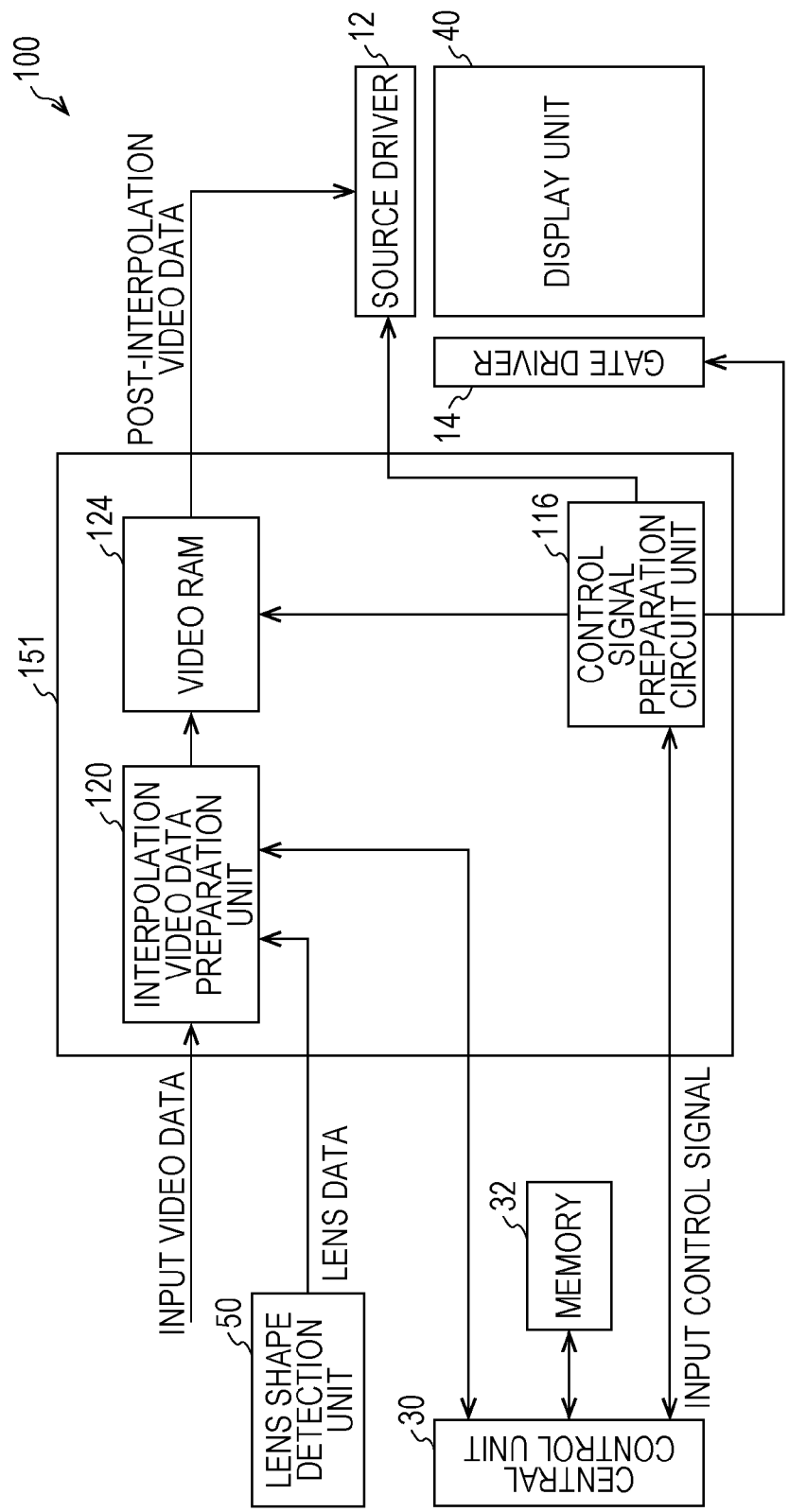
FIG. 19 is a view illustrating the schematic configuration of a liquid crystal display apparatus according to another embodiment of the present invention.

FIG. 19 is a view illustrating the schematic configuration of a liquid crystal display apparatus 100 according to the embodiment.

As shown in FIG. 19, the liquid crystal display apparatus 100 according to the embodiment includes a video data interpolation unit 151, and the video data interpolation unit 151 includes an interpolation video data preparation unit 120.

In the liquid crystal display apparatus 100 according to the embodiment, lens data prepared by the lens shape detection unit 50 are input to the interpolation video data preparation unit 120.

(Method of Preparing Interpolation Video Data)

The liquid crystal display apparatus 100 according to the embodiment mainly has a different method of preparing the interpolation video data, compared to the liquid crystal display apparatus 10 according to the first embodiment.

That is, in the liquid crystal display apparatus 10 according to the first embodiment, when a pixel A in which coordinates are x and gradation is y is expressed as (Ax, Ay), the interpolation video data preparation unit 20 prepares the interpolation video data regardless of the lens data such that the gradation $y_n$ of the n-th interpolation video data between the pixel A (Ax, Ay) and a pixel B (Bx, By) is as follows:

$$y_n = ax_n + Ay : a = (By - Ay)/x$$

In contrast, in the liquid crystal display apparatus 100 according to the embodiment, the interpolation video data preparation unit 120 prepares the interpolation video data based on the lens data.

More specifically, when the change in the shape of the lens 70 occurs, the curved surface shape of the lens 70 acquired after the change of the shape is estimated based on the deviation amount as the lens data, and the enlargement width l is calculated based on the acquired curved surface shape, and determines the number of interpolations (the number of interpolation video data).

Further, the gradations of the interpolation video data are determined based on the gradations of the original video data and the number of interpolations.

Meanwhile, in the embodiment, the liquid crystal display apparatus 100 may include a data preparation LUT in which the gradation and the number of interpolations of the interpolation video data are stored after being associated with the deviation amount.

Accordingly, it is possible to prepare the interpolation video data of a gradation of each of the original video data of pixels which are adjacent to each other and a gradation determined according to the deviation amount.

In addition, when the original video data are arranged according to the arrangement of the pixels, it is possible to arrange the number of interpolation video data, which are determined according to the deviation amount, between the original video data which are adjacent to each other.

Accordingly, it is possible to prepare the interpolation video data without performing complicated calculation.

According to the liquid crystal display apparatus 100 of the embodiment, when the change in the shape of the lens 70 occurs, it is possible to acquire the post-interpolation video data based on the curved surface shape of the actual lens after the change in the shape.

Accordingly, even when the change in the shape of the lens 70 occurs, the expansion display of the video is suppressed based on the change in the shape by measuring the deviation amount in the case of the change in the shape, preparing the interpolation video data based on the deviation amount, and selecting the post-interpolation video data.

Meanwhile, it is possible to use the method described in the first embodiment for the selection of the post-interpolation video data. In addition, simply, when the original video data and the interpolation video data are sequentially arranged as shown in FIG. 15, the post-interpolation video data may be selected such that the selected post-interpolation video data are positioned at equal intervals.

In addition, in the example, the gradations of the interpolation video data are determined using the linear function. However, the present invention is not limited thereto. It is possible to determine the gradation of the interpolation video data using a polynomial function, and it is possible to separately use a plurality of various polynomial functions according to the deviation amount.

In addition, the interpolation video data preparation range may be configured to change based on the deviation amount, and an LUT, in which the interpolation video data preparation range is stored after being associated with the deviation amount, may be used.

In addition, it is possible to express the liquid crystal display apparatus 100 according to the embodiment as below. That is, the video data interpolation unit 151 includes the interpolation video data preparation unit 120 which prepares the interpolation video data which have gradations determined according to the gradations of the respective original video data of the pixels which are adjacent to each other and the deviation amount.

In addition, the video data interpolation unit 151 includes the interpolation video data preparation unit 120 which prepares the number of interpolation video data which are determined according to the deviation amount with regard to each of the original video data of the pixels which are adjacent to each other.

Modification Example

Modification example of the above-described first embodiment and the second embodiment will be described with reference to FIGS. 20 to 22. Meanwhile, for convenience of explanation, the same reference symbol is attached to a member, which has the same function as in the drawings described in the above embodiments, and the description thereof will not be repeated.

Figure 20:
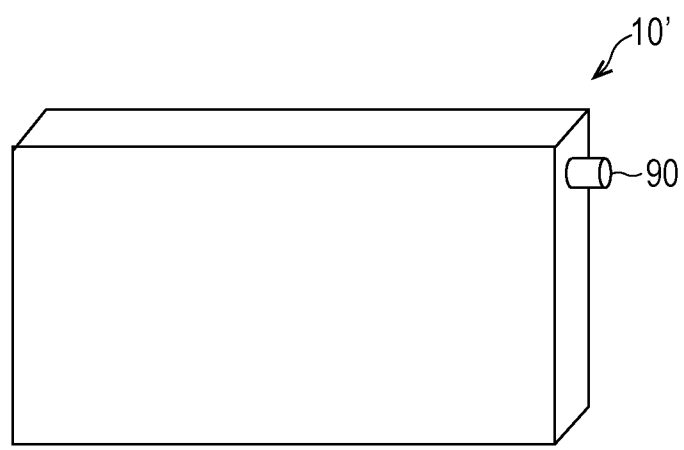
FIG. 20 is a perspective view illustrating a liquid crystal display apparatus according to a modification example of the present invention.

FIG. 20 is a perspective view illustrating a liquid crystal display apparatus 10' according to a modification example of the first embodiment.

The liquid crystal display apparatus 10' according to the modification example is provided with a manual adjustment unit 90 which can be operated by an observer. When the observer manually adjusts the manual adjustment unit 90, the post-interpolation video data are selected again according to the operation performed by the observer. It is possible to use a manual volume as the manual adjustment unit 90.

Figure 21:
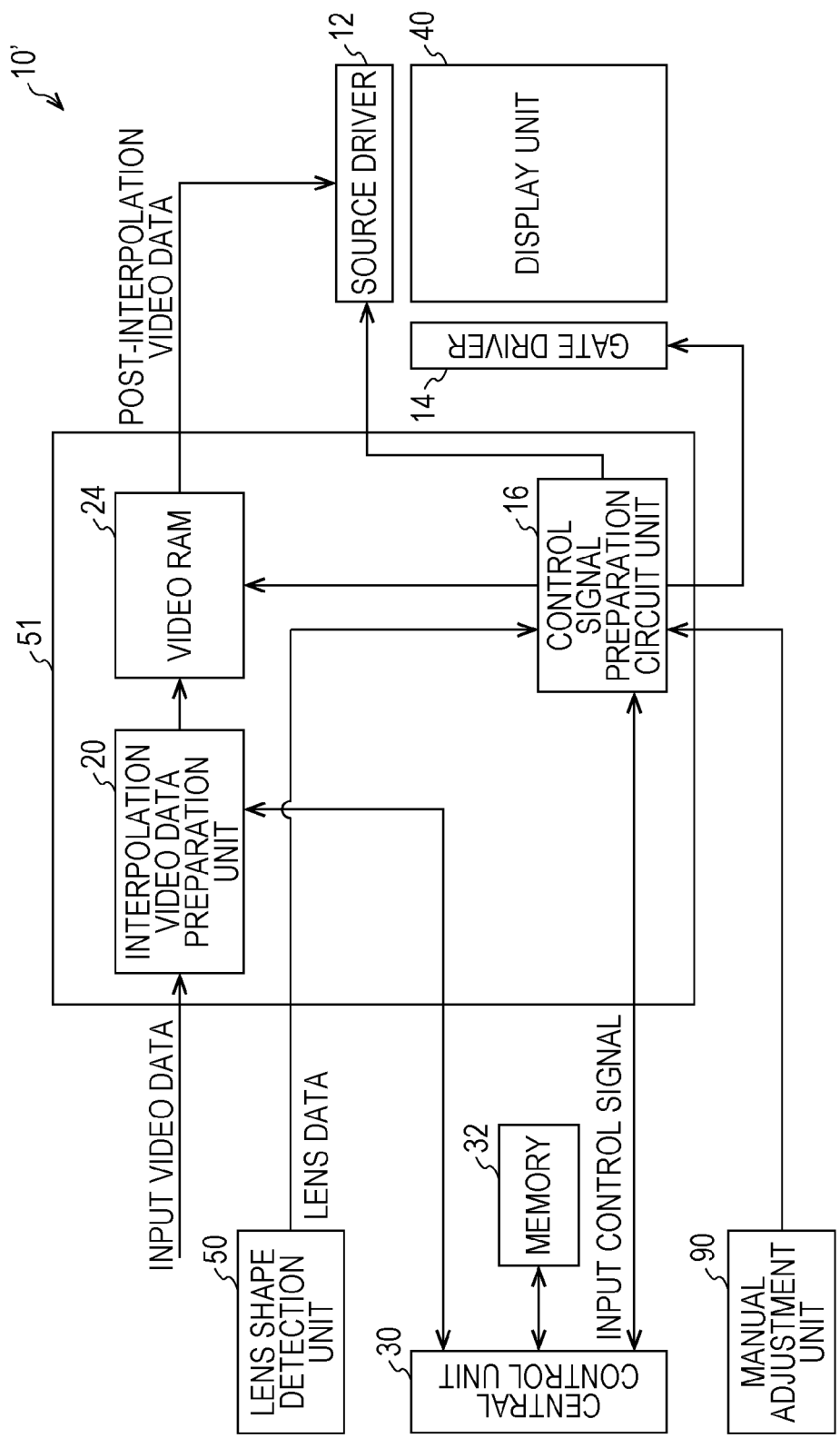
FIG. 21 is a view illustrating the schematic configuration of a liquid crystal display apparatus according to a modification example of a first embodiment of the present invention.

FIG. 21 is a view illustrating the schematic configuration of the liquid crystal display apparatus 10' according to the modification example of the first embodiment.

In the liquid crystal display apparatus 10', the manual adjustment unit 90, in response to an operation performed by the observer, prepares an operation signal corresponding to the operation performed by the observer, and inputs the operation signal to the control signal preparation circuit unit 16.

The control signal preparation circuit unit 16 which receives the operation signal selects the post-interpolation video data again according to the operation signal.

Figure 22:
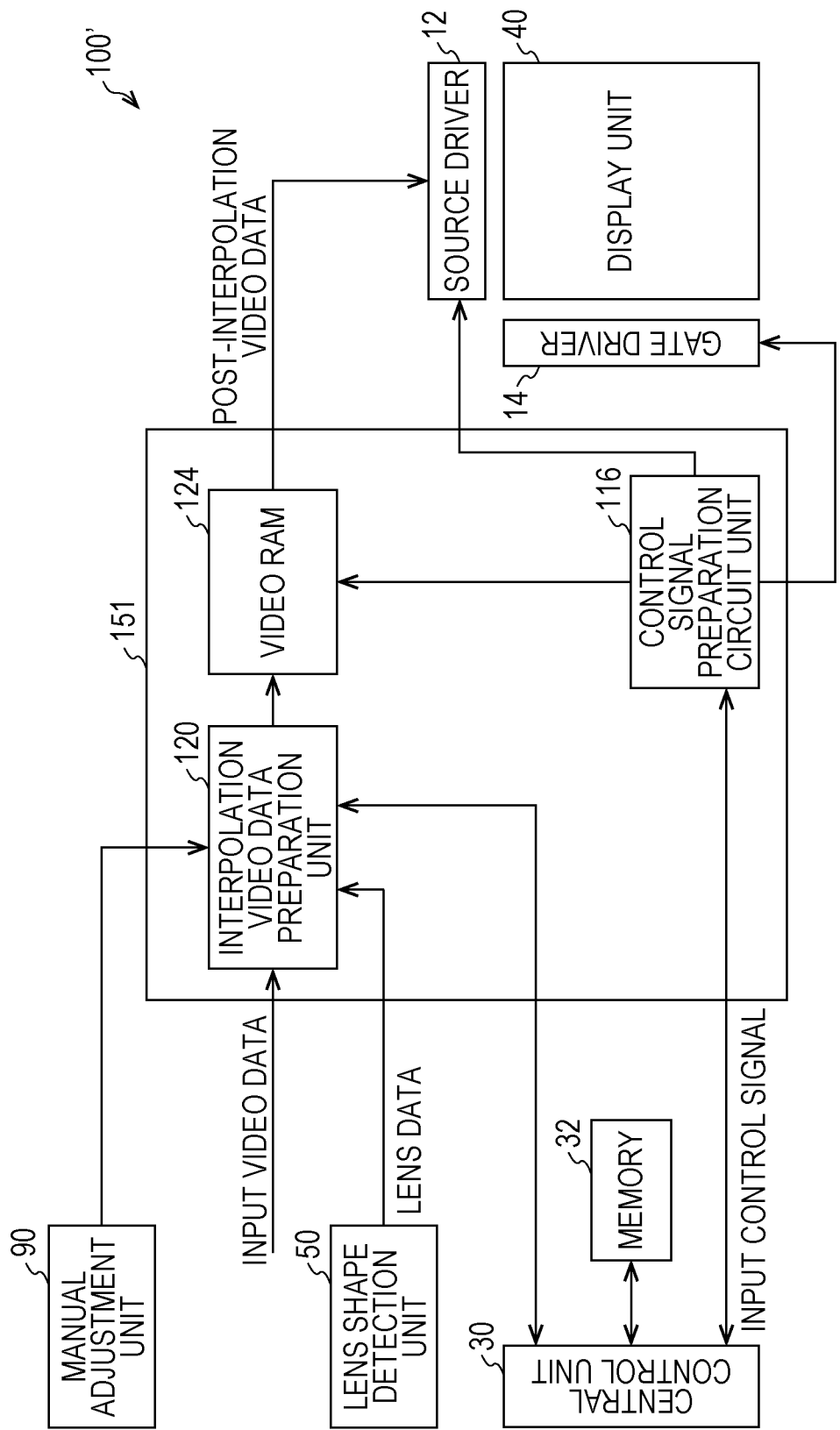
FIG. 22 is a view illustrating the schematic configuration of a liquid crystal display apparatus according to a modification example of a second embodiment of the present invention.
Figure 23:
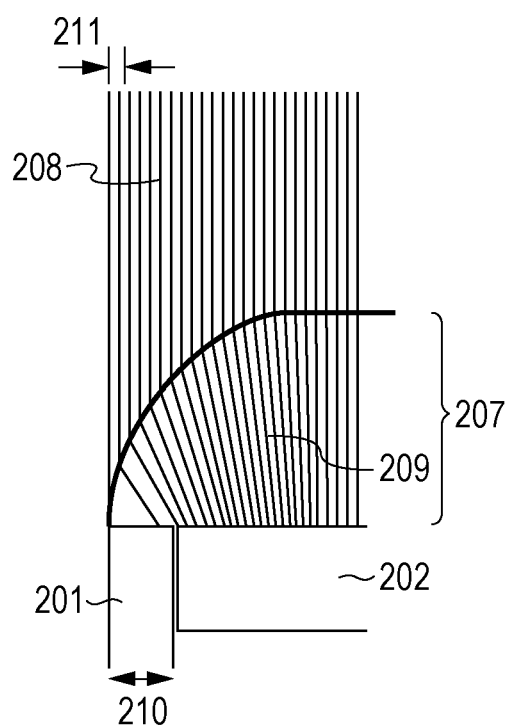
FIG. 23 is a view illustrating a related technology for explaining a multi-projection type screen disclosed in PTL 1.

FIG. 22 is a view illustrating the schematic configuration of a liquid crystal display apparatus 100' according to the modification example of the second embodiment.

In the liquid crystal display apparatus 100', the manual adjustment unit 90, in response to an operation performed by the observer, prepares an operation signal corresponding to the operation performed by the observer, and inputs the operation signal to the interpolation video data preparation unit 120.

The interpolation video data preparation unit 120, which receives the operation signal, prepares the interpolation video data again according to the operation signal.

In the liquid crystal display apparatus 10' or 100' according to the modification example, the video data interpolation unit 51 or 151 can prepare the post-interpolation video data again according to the operation performed on the manual adjustment unit 90 by the observer.

Accordingly, when the post-interpolation video data are prepared again according to the fine adjustment of the manual adjustment unit 90, it is possible to acquire optimum display.

Since it is possible to adjust a video based on a video which is actually observed by the observer in the liquid crystal display apparatus 10' or 100', it is possible to further reliably adjust the video to the optimum display.
(Overview)

According to an aspect of the invention, there is provided a liquid crystal display apparatus 10 or 100 that includes a liquid crystal display panel 40 and a lens 70 or 71 which covers a display surface 42 of the liquid crystal display panel 40, the liquid crystal display panel 40 including pixels arranged in a matrix shape, the lens 70 or 71 including a curved surface range 70b in which a surface of the lens 70 or 71 is a convex curved surface, and that displays an image based on video data corresponding to the respective pixels, the liquid crystal display apparatus 10 or 100 including: a video data interpolation unit 51 or 151 to which original video data that are the video data are input, which prepares interpolation video data that are the video data having gradations between gradations of the original video data of the pixels which are adjacent to each other, which arranges the original video data in order of corresponding pixels, and which prepares post-interpolation video data that are the video data corresponding to the number of the pixels and that are selected from the video data in which the original video data are combined with the interpolation video data when interpolation video data are arranged such that the gradations are continued between the original video data of the corresponding pixels; and an acquisition unit 50 that acquires a deviation amount, in which an end 71d on the lens 70 or 71 is displaced from one end 70d acquired before the change of the shape, in association with a change in a shape of the lens 70 or 71, and the video data interpolation unit 51 or 151 prepares the post-interpolation video data based on the deviation amount.

According to the configuration, the video data interpolation unit 51 or 151 prepares the post-interpolation video data based on the deviation amount (that is, the amount of change in the shape of the lens) in which the one end 71d of the lens 70 is displaced from the one end 70d acquired before the change of the shape in association with the change in the shape of the lens.

Therefore, since it is possible for the video data interpolation unit 51 or 151 to prepare the post-interpolation video data according to the shape of the lens 70 or 71, there is an advantage in that it is possible to suppress the expansion and contraction of the display image, which occur in association with the change in the shape of the lens in the liquid crystal display apparatus 10 or 100 which includes the lens on the display surface.

Further, in the liquid crystal display apparatus 10 or 100 according to the aspect of the present invention, the video data interpolation unit 51 or 151 may include a control signal preparation circuit unit 16 or 116 that selects the video data in a position of the arrangement of the video data, determined according to the deviation amount, from the video data in which the original video data are combined with the interpolation video data, as the post-interpolation video data.

According to the configuration, the control signal preparation circuit unit 16 or 116 selects the video data in the position of the arrangement of the video data, determined according to the deviation amount, as the post-interpolation video data.

Therefore, in the liquid crystal display apparatus 10 or 100 which includes the lens on the display surface, it is possible to select the post-interpolation video data according to the change in the shape of the lens, and thus there is an advantage in that it is possible to suppress the expansion and contraction of the display image, which occur in association with the change in the shape of the lens.

Further, in the liquid crystal display apparatus 10 or 100 according to the aspect of the present invention, the video data interpolation unit 51 or 151 may include an interpolation video data preparation unit 20 or 120 that prepares the interpolation video data having the gradations determined according to the deviation amount such that the interpolation video data correspond to between the respective pixels which are adjacent to each other.

According to the configuration, the interpolation video data preparation unit 20 or 120 prepares the interpolation video data having the gradations determined according to the deviation amount.

Therefore, in the liquid crystal display apparatus 10 or 100 which includes the lens on the display surface, it is possible to prepare the interpolation video data having the gradations determined according to the change in the shape of the lens, and thus there is an advantage in that it is possible to suppress the expansion and contraction of the display image, which occur in association with the change in the shape of the lens.

Further, in the liquid crystal display apparatus 10 or 100 according to the aspect of the present invention, the video data interpolation unit 51 or 151 may include the interpolation video data preparation unit 20 or 120 that prepares the number of interpolation video data determined according to the deviation amount such that the interpolation video data correspond to between the respective pixels which are adjacent to each other.

According to the configuration, the interpolation video data preparation unit 20 or 120 prepares the number of interpolation video data determined according to the deviation amount.

Therefore, in the liquid crystal display apparatus 10 or 100 which includes the lens on the display surface, it is possible to prepare the number of interpolation video data determined according to the change in the shape of the lens, and thus there is an advantage in that it is possible to suppress expansion and contraction of a display image which occur in accordance with the change in the shape of the lens.

Further, the liquid crystal display apparatus 10 or 100 according to the aspect of the present invention may further include a manual adjustment unit that can be operated by an observer, and the video data interpolation unit 51 or 151 may prepare the post-interpolation video data according to an operation performed on the manual adjustment unit by the observer.

According to the configuration, since it is possible for the observer to adjust video based on video which has been actually observed, it is possible for the observer to adjust the video such that the video has a desired quality.

Further, according to another aspect of the invention, there is provided a display method of a liquid crystal display apparatus 10 or 100 that includes a liquid crystal display panel 40 and a lens 70 or 71 which covers a display surface 42 of the liquid crystal display panel 40, the liquid crystal display panel 40 including pixels arranged in a matrix shape, the lens 70 or 71 including a curved surface range 70*b* in which a surface of the lens 70 or 71 is a convex curved surface, and that displays an image based on video data corresponding to the respective pixels, the display method including: a step of, when it is assume that the video data which originally correspond to the respective pixels are set to original video data, preparing interpolation video data that are the video data having gradations between gradations of the original video data of the pixels which are adjacent to each other, arranging the original video data in order of corresponding pixels, and preparing post-interpolation video data that are the video data corresponding to the number of the pixels and that are selected from the video data in which the original video data are combined with the interpolation video data when interpolation video data are arranged such that the gradations are continued between the original video data of the corresponding pixels; and a step of acquiring a deviation amount, in which an end 71*d* on the lens 70 is displaced from one end 70*d* acquired before the change of the shape, in association with a change in a shape of the lens 70, and the step of preparing the post-interpolation video data based on the deviation amount.

According to the configuration, the post-interpolation video data are prepared based on the amount of change in the shape of the lens.

Therefore, in the liquid crystal display apparatus 10 or 100 which includes the lens on the display surface, there is an advantage in that it is possible to suppress the expansion and contraction of the display image, which occur in association with the change in the shape of the lens.

In the above description, although the liquid crystal display panel is described as an example of the display unit, the present invention is not limited thereto. It is possible to use a display panel other than the liquid crystal display panel or a display module as the display unit according to the present invention.

The present invention is not limited to each of the above-described embodiments, and various modifications are possible without departing from the scope of Claims. Embodiments acquired by appropriately combining technical means respectively disclosed in different embodiments are included in the technical scope of the present invention.

INDUSTRIAL APPLICABILITY

Since the present invention is capable of suppressing expansion display using a simple configuration, it is possible to suitably use the present invention for a mobile terminal, such as a game terminal which includes a display unit having a lens on the display surface, a television, or the like.

REFERENCE SIGNS LIST

10, 100 liquid crystal display apparatus (display apparatus)

16, 116 control signal preparation circuit unit (data selection unit)
20, 120 interpolation video data preparation unit
40 liquid crystal display panel (display unit)
46 display area
48 non-display area
50 lens shape detection unit
51, 151 video data interpolation unit
64 display area
70, 71 lens
70*d*, 71*d* end (measurement position)
90 manual adjustment unit

The invention claimed is:

1. A display apparatus that includes a display and a lens which covers a display surface of the display, the display including pixels arranged in a matrix shape, the lens including a curved surface range in which a surface of the lens is a convex curved surface, and that displays an image based on video data corresponding to the respective pixels, the display apparatus comprising:
   video data interpolation circuitry to which original video data are input, the video data interpolation circuitry: prepares interpolation video data having gradations between a gradation of the original video data of pixels which are adjacent to each other, arranges the original video data in order of corresponding pixels, and prepares post-interpolation video data that are the video data corresponding to a number of the pixels and that are selected from the video data in which the original video data are combined with the interpolation video data when the interpolation video data are arranged such that the gradations are continued between the original video data of the corresponding pixels;
   acquisition circuitry that acquires a deviation amount, in which a measurement position on the lens is displaced from a reference position acquired before a change of a shape of the lens, in association with the change in the shape of the lens; and
   a temperature sensor; wherein
   the acquisition circuitry acquires the deviation amount based on a measurement value provided by the temperature sensor; and
   the video data interpolation circuitry prepares the post-interpolation video data based on the deviation amount.

2. The display apparatus according to claim 1, wherein the video data interpolation circuitry includes data selection circuitry that selects the video data in a position of the arrangement of the video data, determined according to the deviation amount, from the video data in which the original video data are combined with the interpolation video data, as the post-interpolation video data.

3. The display apparatus according to claim 1, wherein the video data interpolation circuitry includes interpolation video data preparation circuitry that prepares the interpolation video data having the gradations determined according to the deviation amount such that the interpolation video data correspond to between the respective pixels which are adjacent to each other.

4. The display apparatus according to claim 1, wherein the video data interpolation circuitry includes the interpolation video data preparation circuitry that prepares a number of interpolation video data, which are determined according to the deviation amount, such that the interpolation video data correspond to between the respective pixels which are adjacent to each other.

5. The display apparatus according to claim 1, further comprising:
manual adjustment circuitry that can be operated by an observer,
wherein the video data interpolation circuitry prepares the post-interpolation video data according to an operation performed on the manual adjustment circuitry by the observer.

6. The display apparatus according to claim 1,
wherein the display surface and the lens have different coefficients of thermal expansion.

7. The display apparatus according to claim 1, wherein in a case where there is the deviation amount, the video data interpolation circuitry prepares the post-interpolation video data by selecting, from the video data, video data whose position is deviated in one direction from a position of video data that is selected from the video data in a case where there is no deviation amount.

8. A display apparatus, comprising:
a display including pixels arranged in a matrix shape, the display apparatus displaying an image based on video data corresponding to respective ones of the pixels;
a lens which covers a display surface of the display, the lens including a curved surface range in which a surface of the lens is a convex curved surface and the display surface and the lens having different coefficients of thermal expansion;
video data interpolation circuitry to which original video data are input, the video data interpolation circuitry: prepares interpolation video data having gradations between a gradation of the original video data of pixels which are adjacent to each other, arranges the original video data in order of corresponding pixels, and prepares post-interpolation video data that are the video data corresponding to a number of the pixels and that are selected from the video data in which the original video data are combined with the interpolation video data when the interpolation video data are arranged such that the gradations are continued between the original video data of the corresponding pixels; and
acquisition circuitry that acquires a deviation amount, in which a measurement position on the lens is displaced from a reference position acquired before a change of a shape of the lens, in association with the change in the shape of the lens; wherein
the video data interpolation circuitry prepares the post-interpolation video data based on the deviation amount.

9. The display apparatus according to claim 8, wherein
the video data interpolation circuitry includes data selection circuitry that selects the video data in a position of the arrangement of the video data, determined according to the deviation amount, from the video data in which the original video data are combined with the interpolation video data, as the post-interpolation video data.

10. The display apparatus according to claim 8, wherein
the video data interpolation circuitry includes interpolation video data preparation circuitry that prepares the interpolation video data having the gradations determined according to the deviation amount such that the interpolation video data correspond to between the respective pixels which are adjacent to each other.

11. The display apparatus according to claim 8, wherein
the video data interpolation circuitry includes interpolation video data preparation circuitry that prepares the number of interpolation video data, which are determined according to the deviation amount, such that the interpolation video data correspond to between the respective pixels which are adjacent to each other.

12. The display apparatus according to claim 8, further comprising:
manual adjustment circuitry that is operable by an observer, wherein
the video data interpolation circuitry prepares the post-interpolation video data according to an operation performed on the manual adjustment circuitry by the observer.

13. The display apparatus according to claim 8, further comprising:
a temperature sensor,
wherein the acquisition circuitry acquires the deviation amount based on a measurement value of the temperature sensor.

14. The display apparatus according to claim 8,
wherein, in a case where there is the deviation amount, the video data interpolation circuitry prepares the post-interpolation video data by selecting, from the video data, video data whose position is deviated in one direction from a position of video data that is selected from the video data in a case where there is no deviation amount.

15. A display apparatus that includes a display and a lens which covers a display surface of the display, the display including pixels arranged in a matrix shape, the lens including a curved surface range in which a surface of the lens is a convex curved surface, and that displays an image based on video data corresponding to the respective pixels, the display apparatus comprising:
video data interpolation circuitry to which original video data are input, the video data interpolation circuitry: prepares interpolation video data having gradations between a gradation of the original video data of pixels which are adjacent to each other, arranges the original video data in order of corresponding pixels, and prepares post-interpolation video data that are the video data corresponding to a number of the pixels and that are selected from the video data in which the original video data are combined with the interpolation video data when the interpolation video data are arranged such that the gradations are continued between the original video data of the corresponding pixels; and
a temperature sensor, wherein
the video data interpolation circuitry prepares the post-interpolation video data based on a measurement value from the temperature sensor.

16. The display apparatus according to claim 15, further comprising:
a manual adjustment circuitry that is operable by an observer, wherein
the video data interpolation circuitry prepares the post-interpolation video data according to an operation performed on the manual adjustment circuitry by the observer.

17. The display apparatus according to claim 15, wherein
the display surface and the lens have different coefficients of thermal expansion.

* * * * *